United States Patent
Aghamohammadi et al.

(10) Patent No.: US 9,996,944 B2
(45) Date of Patent: Jun. 12, 2018

(54) SYSTEMS AND METHODS FOR MAPPING AN ENVIRONMENT

(71) Applicant: QUALCOMM Incorporated, San Diego, CA (US)

(72) Inventors: Aliakbar Aghamohammadi, San Diego, CA (US); Kiran Somasundaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/268,203

(22) Filed: Sep. 16, 2016

(65) Prior Publication Data

US 2018/0012370 A1 Jan. 11, 2018

Related U.S. Application Data

(60) Provisional application No. 62/359,083, filed on Jul. 6, 2016.

(51) Int. Cl.
| | |
|---|---|
| G06K 9/00 | (2006.01) |
| G06T 7/50 | (2017.01) |
| G06K 9/62 | (2006.01) |
| G06T 7/55 | (2017.01) |

(52) U.S. Cl.
CPC .............. G06T 7/50 (2017.01); G06K 9/6289 (2013.01); G06T 7/55 (2017.01); *G06T 2207/10028* (2013.01); *G06T 2207/20076* (2013.01)

(58) Field of Classification Search
CPC ........ G06K 9/6289; G06T 2207/20076; G06T 2207/10028
See application file for complete search history.

(56) References Cited

U.S. PATENT DOCUMENTS

| | | | |
|---|---|---|---|
| 6,067,366 A * | 5/2000 | Simanovsky | G06K 9/00771 345/424 |
| 6,266,453 B1 | 7/2001 | Hibbard et al. | |
| 7,715,626 B2 | 5/2010 | Florin et al. | |
| 8,213,707 B2 | 7/2012 | Li et al. | |
| 8,427,472 B2 | 4/2013 | Moravec | |
| 8,458,188 B2 | 6/2013 | Salemann | |
| 2004/0039498 A1 | 2/2004 | Ollis et al. | |
| 2006/0025888 A1* | 2/2006 | Gutmann | G06K 9/00664 700/245 |

(Continued)

OTHER PUBLICATIONS

Agha-Mohammadi A., et al., "Graph-based Stochastic Control with Constraints: A Unified Approach with Perfect and Imperfect Measurements," in American Control Conference (ACC), Washington DC, 2013, pp. 1-6.

(Continued)

*Primary Examiner* — John Strege
(74) *Attorney, Agent, or Firm* — Austin Rapp & Hardman, P.C.

(57) ABSTRACT

A method for mapping an environment by an electronic device is described. The method includes obtaining a set of sensor measurements. The method also includes determining a set of voxel occupancy probability distributions respectively corresponding to a set of voxels based on the set of sensor measurements. Each of the voxel occupancy probability distributions represents a probability of occupancy of a voxel over a range of occupation densities. The range includes partial occupation densities.

26 Claims, 9 Drawing Sheets

(56) References Cited

U.S. PATENT DOCUMENTS

| | | | | |
|---|---|---|---|---|
| 2009/0119010 | A1* | 5/2009 | Moravec | G05D 1/0251 701/533 |
| 2011/0210915 | A1* | 9/2011 | Shotton | G06K 9/00369 345/157 |
| 2012/0150441 | A1* | 6/2012 | Ma | G01S 5/0252 701/510 |
| 2014/0350839 | A1* | 11/2014 | Pack | G01C 21/30 701/409 |
| 2015/0104089 | A1* | 4/2015 | Litvin | G06T 11/006 382/131 |
| 2017/0255203 | A1* | 9/2017 | Sofman | G05D 1/0274 |
| 2017/0263009 | A1* | 9/2017 | Averbuch | A61B 6/032 |
| 2017/0299727 | A1* | 10/2017 | Irish | G01S 19/42 |

OTHER PUBLICATIONS

Agha-Mohammadi A., et al., "A solution for SLAM through augmenting vision and range information," inInternational Conference on Intelligent Robots and Systems (IROS), Nice,France, Sep. 2008, pp. 1037-1042.

Agha-Mohammadi A., et al., "FIRM: Feedback controller-based Information-state RoadMap—A Framework for Motion Planning Under Uncertainty," inInternational Conference on Intelligent Robots and Systems (IROS), SanFrancisco, CA, 2011, 14 Pages.

Agha-Mohammadi A., et al., "FIRM: Sampling-based Feedback Motion Planning Under Motion Uncertainty and Imperfect Measurements," International Journal of Robotics Research (IJRR),2014, vol. 33, No. 2, pp. 268-304.

Agha-Mohammadi A., et al., "Health aware stochastic planning for persistent package delivery missions using quadrotors," in International Conference on Intelligent Robots and Systems (IROS), Chicago, IL, Sep. 2014, pp. 3389-3396.

Agha-Mohammadi A., et al., "Robust Online Belief Space Planning in Changing Environments: Application to Physical Mobile Robots," inIEEE International Conference on Robotics and Automation (ICRA), Hong Kong, China, 2014, 8 Pages.

Agha-Mohammadi A., et al., "SLAM Based on the LRF Information as the Only Data Source," in International Federation of Automatic Control, (IFAC), Seoul, Korea, Jul. 2008, pp. 14657-14662.

Agha-Mohammadi A., et al., "SLAP: Simultaneous Localization and Planning for Physical Mobile Robots via Enabling Dynamic Replanning in Belief Space," IEEE Transactions on Robotics (TRO), Oct. 26, 2015, 18 Pages.

Aghamohammadi A.A., et al., "Feature-Based Laser Scan Matching for Accurate and High Speed Mobile Robot Localization," in European Conference on Mobile Robots (ECMR), Freiburg, Germany, 2007, pp. 114-119.

Lavalle S.M., et al., "Randomized kinodynamic planning," International Journal of Robotics Research,2001, vol. 20, No. 5, pp. 378-400.

Mu B., et al., "Two-Stage Focused Inference for Resource-Constrained Collision-Free Navigation," inRobotics: Science and Systems (RSS), Rome, Italy, Jul. 2015, 9 Pages.

Thrun S., et al., "Probabilistic Robotics," MIT Press, 2005.

Elfes A., "Using Occupancy Grids for Mobile Robot Perception and Navigation", Computer, IEEE, US, vol. 22, No. 6, Jun. 1, 1989, XP011436714, pp. 46-57.

International Search Report and Written Opinion—PCT/US2017/029133—ISA/EPO—dated Sep. 8, 2017.

Styler A., et al., "Statistical Techniques in Robotics—Mapping," Jan. 1, 2012, XP055402963, Retrieved from the Internet: URL:http://www.cs.cmu.edu/-16831-f12/notes/F12/16831_lecture05_vh.pdf, pp. 1-5.

Thrun S., "Learning Occupancy Grids with Forward Models," Proceedings of the 2001 IEEE/RSJ International Conference on Intelligent Robots and Systems, (IROS 2001), Maui, Hawaii, Oct. 29-Nov. 3, 2001, IEEE, US, Oct. 29, 2001 (Oct. 29, 2001), vol. 3, pp. 1676-1681, XP010573812, DOI: 10.1109/IROS.2001.977219, ISBN: 978-0-7803-6612-1.

* cited by examiner

SYSTEMS AND METHODS FOR MAPPING AN ENVIRONMENT

RELATED APPLICATION

This application is related to and claims priority to U.S. Provisional Patent Application Ser. No. 62/359,083, filed Jul. 6, 2016, for "SYSTEMS AND METHODS FOR MAPPING AN ENVIRONMENT."

FIELD OF DISCLOSURE

The present disclosure relates generally to electronic devices. More specifically, the present disclosure relates to systems and methods for mapping an environment.

BACKGROUND

Some electronic devices capture and/or utilize sensed data. For example, a camera may capture and/or process data from a sensor. Processing sensed data may demand a relatively large amount of time, processing, memory, and energy resources. The resources demanded may vary in accordance with the complexity of the processing.

Some processing techniques may yield inaccurate and/or less useful results. For example processed sensor data may not provide results with a desired accuracy for some applications. As can be observed from this discussion, systems and methods that improve sensor data processing may be beneficial.

SUMMARY

A method for mapping an environment by an electronic device is described. The method includes obtaining a set of sensor measurements. The method also includes determining a set of voxel occupancy probability distributions respectively corresponding to a set of voxels based on the set of sensor measurements. Each of the voxel occupancy probability distributions represents a probability of occupancy of a voxel over a range of occupation densities. The range includes partial occupation densities. The range of occupation densities may be a continuous range between completely empty and completely occupied.

The method may include determining a set of confidence values respectively corresponding to the set of voxels. Each of the set of confidence values may be a variance respectively based on each of the set of voxel occupancy probability distributions.

The method may include updating the set of voxel occupancy probability distributions. Determining and updating each of the set of voxel occupancy probability distributions may be based on an inverse cause model. Determining and updating each of the set of voxel occupancy probability distributions may be based on Bayes' rule. Determining and updating each of the set of voxel occupancy probability distributions may be based on a fusion of measurements from different times. Determining and updating each of the set of voxel occupancy probability distributions may be based on a fusion of measurements from different sensors. Updating each of the set of voxel occupancy probability distributions may include multiplying a previous probability distribution with an affine function.

Determining the set of voxel occupancy probability distributions may be based on an inverse cause model. The inverse cause model may model a probability that a voxel is a cause of one or more of the set of sensor measurements.

An electronic device for mapping an environment is also described. The electronic device includes a processor configured to obtain a set of sensor measurements. The processor is also configured to determine a set of voxel occupancy probability distributions respectively corresponding to a set of voxels based on the set of sensor measurements. Each of the voxel occupancy probability distributions represents a probability of occupancy of a voxel over a range of occupation densities. The range includes partial occupation densities.

A computer-program product for mapping an environment is also described. The computer-program product includes a non-transitory tangible computer-readable medium with instructions. The instructions include code for causing an electronic device to obtain a set of sensor measurements. The instructions also include code for causing the electronic device to determine a set of voxel occupancy probability distributions respectively corresponding to a set of voxels based on the set of sensor measurements. Each of the voxel occupancy probability distributions represents a probability of occupancy of a voxel over a range of occupation densities. The range includes partial occupation densities.

An apparatus for mapping an environment is also described. The apparatus includes means for obtaining a set of sensor measurements. The apparatus also includes means for determining a set of voxel occupancy probability distributions respectively corresponding to a set of voxels based on the set of sensor measurements. Each of the voxel occupancy probability distributions represents a probability of occupancy of a voxel over a range of occupation densities. The range includes partial occupation densities.

DETAILED DESCRIPTION

Figure 1:
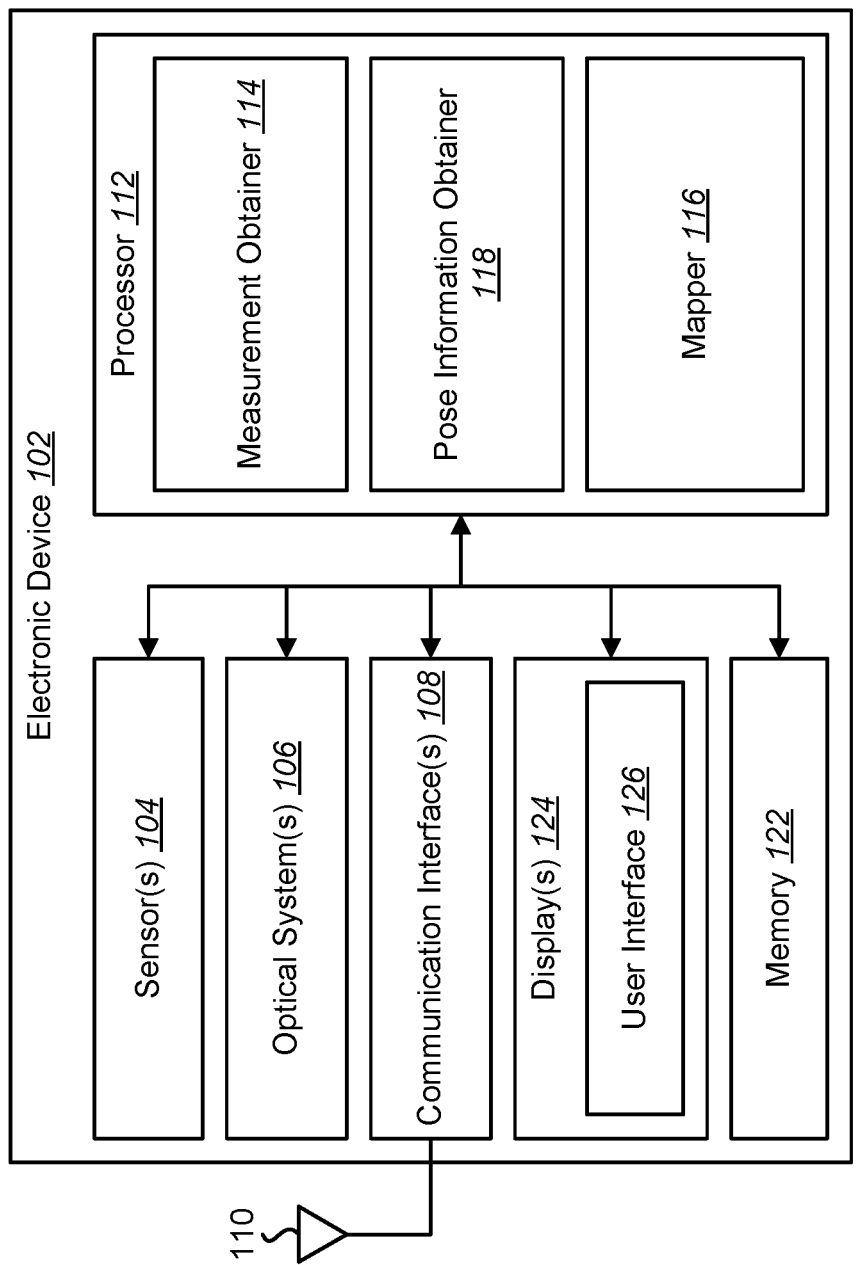
FIG. 1 is a block diagram illustrating one example of an electronic device in which systems and methods for mapping an environment may be implemented.

Some configurations of the systems and methods disclosed herein may relate to mapping an environment. For example, some configurations of the systems and methods disclosed herein may provide measurement fusion for three-dimensional (3D) grid mapping using cause-dependent inverse cause models.

One objective of the some configurations of the systems and methods disclosed herein is to construct a grid-based 3D map of an environment, augmented by the uncertainty (e.g., confidence) associated with each grid voxel. For example, one or more sensors (e.g., cameras, depth sensors, light radar or light detection and ranging (LIDAR) sensors, etc.) may be utilized to capture measurements of an environment. The measurements may be utilized to construct the 3D map, where the 3D map includes a set of voxels or cells. The 3D map may be utilized for planning a route and/or navigation (e.g., for a robot, self-driving vehicle, etc.). The systems and methods disclosed herein may lead to safer plans. Some configurations of the systems and methods disclosed herein may rely on an inverse cause model. A cell-based Bayesian method may be utilized for maintaining and updating the grid map information. This approach may be significantly different from other mapping approaches that model uncertainty using loose heuristics.

Mapping may refer to one or more procedures for constructing a representation of an environment. Some approaches for mapping (in robotics, for example) may utilize grid-based mapping, where the 3D space is represented by a grid of voxels (or cells). In particular, an underlying geometric representation of the world may be a grid comprised of "cells" or "voxels." Each voxel may be occupied to some extent, which may be referred to as density. A device (e.g., a computing device, a robot, a moving object, etc.) may be equipped with a one or more sensors (e.g., depth sensors, stereo camera (which may be modeled as a disparity sensor, for instance), laser range finder, LIDAR, etc.). An objective of some configurations of the systems and methods disclosed herein may be to estimate the density of map voxels. Grid mapping may refer to populating a grid of voxels (e.g., cells) with density values. Density of a given voxel (e.g., cell) may refer to a portion (e.g., fraction) of the cell that is occupied by objects in the 3D world.

In order to infer a map from raw sensory measurements, a sensor model may be utilized. Mathematically, a sensor model (e.g., forward sensor model) may refer to the probability distribution function (PDF) that describes a measurement distribution given the sensor position and state. Some limitations of some approaches are that there is no mapping framework that can utilize a forward sensor model and update a density map in a recursive way. Some approaches mainly rely on ad-hoc inverse sensor models.

In particular, some approaches to determining a map may rely on ad-hoc inverse sensor models. The inverse sensor model (INS) refers to a probability that describes the occupancy of a specific voxel given the measurement. In particular, inverse sensor models are widely used in occupancy grid mapping (also referred to as log-odds mapping). Inverse sensor model usage has several limitations. In particular, its usage is limited to cases when density is only 1 or 0 (fully occupied or empty). It does not provide a confidence (e.g., a full PDF) over the density values. It is designed in an ad-hoc fashion with a lot of tuning parameters. Furthermore, there is no principled way of computing the inverse sensor model. It should be noted that in some approaches, a value between 0 and 1 (e.g., 0.5) may be utilized to represent an unknown occupancy. However, this may be different from some configurations of the systems and methods disclosed herein, since the value (e.g., 0.5) is being used to represent an unknown occupancy (not a half occupation density, for example).

In contrast to some approaches, some configurations of the systems and methods disclosed herein may utilize one or more inverse cause models (INCs). The inverse cause model may refer to the PDF over all possible causes for a given measurement. The inverse cause model has advantages over the inverse sensor model. In particular, the inverse cause model can be applied to cases where the density is any number between 0 and 1, and thus is not sensitive to voxel size. The inverse cause model may provide confidence (e.g., a full PDF) over the density values. There is a principled way of computing the inverse cause model based on the forward sensor model. In some approaches, utilizing the inverse cause model may avoid utilizing the heuristics of some inverse sensor model approaches and/or may avoid the computational intractability of some forward sensor model approaches. Also, the ability to fuse different measurements (and/or sensors) is maintained in the inverse cause model.

At a high level, the inverse sensor model describes the behavior of the sensor, while the inverse cause model describes the cause (from the environment) for that behavior. There is a fundamental modeling difference in approaches between the inverse sensor model and the inverse cause model. For example, given a measurement/observation, one difference between the inverse sensor model and inverse cause model may be described as follows. The inverse sensor model may try to predict the occupancy of various voxels given the measurement (e.g., whether a voxel completely occupied or not, the "1-0-ness" of a voxel). In comparison, some configurations of the inverse cause model may try to reason the measurement. For example, the inverse cause model may predict the cause for the measurement (e.g., whether the ray got reflected from a particular voxel). In some approaches, the inverse cause model may not just predict whether a voxel is completely occupied or not, but may be utilized to determine a probability distribution over a range of occupation densities, including partial occupation densities.

Given an unknown environment, some configurations of the systems and methods disclosed herein may provide a mapping solution with noisy sensor measurements. In some configurations of the systems and methods disclosed herein, environment mapping may be utilized for motion planning (e.g., robotic motion planning) and/or navigation in uncertain environments.

Various configurations are now described with reference to the Figures, where like reference numbers may indicate functionally similar elements. The systems and methods as generally described and illustrated in the Figures herein may be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for mapping an environment may be implemented. Examples of the electronic device 102 include cameras, video camcorders, digital cameras, cellular phones, smart phones, computers (e.g., desktop computers, laptop computers, servers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, appliances, etc. The electronic device 102 may include one or more components or elements. One or more of the components or elements may be implemented in hardware (e.g., circuitry), a combination of hardware and firmware, and/or a combination of hardware and software (e.g., a processor with instructions).

In some configurations, the electronic device 102 may perform one or more of the functions, procedures, methods, steps, etc., described in connection with one or more of FIGS. 1-9. Additionally or alternatively, the electronic device 102 may include one or more of the structures described in connection with one or more of FIGS. 1-9.

In some configurations, the electronic device 102 may include a processor 112, a memory 122, one or more displays 124, one or more sensors 104 (e.g., one or more depth sensors, stereoscopic cameras, image sensors, light detection and ranging (LIDAR) sensors, time-of-flight (ToF) cameras, motion sensors, position sensors, accelerometers, tilt sensors, gyroscopes, compasses, barometers, etc.), one or more optical systems 106, and/or one or more communication interfaces 108. The processor 112 may be coupled to (e.g., in electronic communication with) the memory 122, display 124, sensor(s) 104, optical system(s) 106, and/or communication interface(s) 108. It should be noted that one or more of the elements of the electronic device 102 described in connection with FIG. 1 (e.g., sensor(s) 104, optical system(s) 106, communication interface(s) 108, display(s) 124, etc.), may be optional and/or may not be included (e.g., implemented) in the electronic device 102 in some configurations.

The processor 112 may be a general-purpose single- or multi-chip microprocessor (e.g., an Advanced RISC (reduced instruction set computing) Machine (ARM)), a special-purpose microprocessor (e.g., a digital signal processor (DSP)), a microcontroller, a programmable gate array, etc. The processor 112 may be referred to as a central processing unit (CPU). Although the processor 112 is shown in the electronic device 102, in an alternative configuration, a combination of processors (e.g., an image signal processor (ISP) and an application processor, an ARM and a DSP, etc.) could be used. The processor 112 may be configured to implement one or more of the methods disclosed herein.

The processor 112 may include and/or implement a measurement obtainer 114, a pose information obtainer 118, and/or a mapper 116. It should be noted that the measurement obtainer 114 and/or the pose information obtainer 118 may not be implemented and/or may be optional in some configurations.

The memory 122 may be any electronic component capable of storing electronic information. For example, the memory 122 may be implemented as random access memory (RAM) (e.g., dynamic random access memory (DRAM)), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The memory 122 may store instructions and/or data. The processor 112 may access (e.g., read from and/or write to) the memory 122. The instructions may be executable by the processor 112 to implement one or more of the methods described herein. Executing the instructions may involve the use of the data that is stored in the memory 122. When the processor 112 executes the instructions, various portions of the instructions may be loaded onto the processor 112 and/or various pieces of data may be loaded onto the processor 112. Examples of instructions and/or data that may be stored by the memory 122 may include sensor data, measurement obtainer 114 instructions, pose information obtainer 118 instructions, mapper 116 instructions, etc. In some configurations, the memory 122 may store one or more probability distributions (e.g., PDFs), one or more confidence values, one or more measurements, one or more density estimates, pose information (e.g., camera position information, sensor position information, etc.), one or more probabilities, one or more functions, etc.

The communication interface(s) 108 may enable the electronic device 102 to communicate with one or more other electronic devices. For example, the communication interface(s) 108 may provide one or more interfaces for wired and/or wireless communications. In some configurations, the communication interface(s) 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, Data Over Cable Service Interface Specification (DOCSIS), etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface and yet another communication interface 108 may be a wireless local area network (WLAN) interface (e.g., Institute of Electrical and Electronics Engineers (IEEE) 802.11 interface). In some configurations, the communication interface 108 may send information (e.g., map information, probability distribution (e.g., PDF) information, voxel occupancy probability distribution information, confidence information, image information, object detection information, etc.) to and/or receive information from another device (e.g., a vehicle, a smart phone, a camera, a display, a remote server, a robot, a drone, etc.).

The electronic device 102 (e.g., measurement obtainer 114) may obtain one or more sensor measurements. For example, the measurement obtainer 114 may obtain a set of sensor measurements (e.g., depth measurements, a depth map, time-of-flight measurements, LIDAR measurements, digital images, image frames, frames, video, captured images, etc.). For instance, the electronic device 102 may include sensor(s) 104 and/or optical system(s) 106 (e.g., lenses) that focus light (e.g., reflected light) of an environment (e.g., surroundings, object(s), etc.) that is located within the field of view of the optical system 106 onto the sensor(s) 104. The optical system(s) 106 may be coupled to and/or controlled by the processor 112 in some configurations. A camera (e.g., a visual spectrum camera, an infrared camera, stereo camera, etc.) may include at least one sensor and may or may not include one or more optical systems.

Accordingly, the electronic device 102 may be one or more cameras and/or may include one or more cameras in some implementations. In some configurations, the sensor(s) 104 may capture the sensor measurement(s) (e.g., depth measurements, a depth map, time-of-flight measurements, LIDAR measurements, stereoscopic image data, disparity measurements, image frames, video, still images, burst mode images, captured images, etc.). In some approaches, a combination of different sensors (e.g., local sensor(s) 104 and/or one or more remote sensors) may be utilized to capture one or more sensor measurements (e.g., one or more sets of sensor measurements). Disparity measurements may indicate a difference based on pixels between images captured from different views (e.g., different angles, stereoscopic images, etc.). The electronic device 102 (e.g., measurement obtainer 114, mapper 116, etc.) may utilize the disparity measurements to determine (e.g., estimate) a depth from the sensors 104 to an object in the field of view of the sensors 104. For example, the electronic device 102 may triangulate an object in the field of view of the sensors 104 in order to determine a depth estimate.

Additionally or alternatively, the electronic device 102 may request and/or receive the set of sensor measurements from another device (e.g., one or more external sensors coupled to the electronic device 102, a network server, vehicle sensor(s), web camera(s), etc.). In some configurations, the electronic device 102 may request and/or receive the set of sensor measurements via the communication interface 108. For example, the electronic device 102 may or may not include sensor(s) (e.g., sensor(s) 104 and/or optical system(s) 106) and may receive a set of sensor measurements from one or more remote device(s). The set of sensor measurements may indicate depths to the environment (e.g., one or more object(s)). One or more of the object(s) may be a target object.

The display(s) 124 may be integrated into the electronic device 102 and/or may be coupled to the electronic device 102. Examples of the display(s) 124 include liquid crystal display (LCD) screens, light emitting display (LED) screens, organic light emitting display (OLED) screens, plasma screens, cathode ray tube (CRT) screens, etc. In some implementations, the electronic device 102 may be a smartphone with an integrated display. In another example, the electronic device 102 may be linked to one or more remote displays 124 and/or to one or more remote devices that include one or more displays 124.

In some configurations, the electronic device 102 may include a camera software application. When the camera application is running, depths of and/or images of objects that are located within the field of view of the optical system(s) 106 may be captured by the sensor(s) 104. The depths and/or images that are being captured by the sensor(s) 104 may be presented on the display 124. For example, one or more images may be sent to the display(s) 124 for viewing by a user. Additionally or alternatively, one or more of the depths may be presented in a visual format. For example, a virtual environment may be created based on the depths and presented on the display(s) 124. In another example, numeric representations may be additionally or alternatively presented. In some configurations, these depths and/or images may be played back from the memory 122, which may include a set of measurements of an earlier captured scene. The set of sensor measurements obtained by the electronic device 102 may be determined from one or more video frames and/or one or more still images (with stereoscopic depth imaging, for example). In some configurations, the display(s) 124 may present automatically focused images, one or more indicators corresponding to one or more target objects (e.g., detected object(s), object(s) of interest, recognized objects(s), etc.) and/or one or more images (e.g., cropped object(s), zoomed object(s), etc.). For example, the processor 112 may, based on a sensed depth, perform automatic zoom, automatic focus, object recognition, and/or other processing. One or more results of the processing based on the set of sensor measurements may be presented on the display(s) 124. For example, a map based on a set of voxel occupancy probability distributions may be presented on the display(s) 124.

In some configurations, the electronic device 102 may present a user interface 126 on the display 124. For example, the user interface 126 may enable a user to interact with the electronic device 102. In some configurations, the user interface 126 may enable a user to interact with the electronic device 102. For example, the user interface 126 may receive a touch, a mouse click, a gesture, a keyboard input, and/or some other indication that indicates an input.

The electronic device 102 (e.g., processor 112) may optionally be coupled to, be part of (e.g., be integrated into), include and/or implement one or more kinds of devices. For example, the electronic device 102 may be implemented in a vehicle or a drone equipped with one or more sensors. In another example, the electronic device 102 (e.g., processor 112) may be implemented in an action camera. In yet other examples, the electronic device 102 may be implemented in an augmented reality headset or a virtual reality headset. In yet another example, the electronic device 102 may be implemented in a robot.

The processor 112 may include and/or implement a measurement obtainer 114. One or more sensor measurements (e.g., depth measurements, a depth map, time-of-flight measurements, LIDAR measurements, stereoscopic image data, disparity measurements, image frames, video, still images, burst mode images, captured images, a depth map, etc.) may be provided to the measurement obtainer 114. For example, the measurement obtainer 114 may obtain depth measurements from one or more sensors 104. For instance, the measurement obtainer 114 may receive depth measurements, stereoscopic image data, ToF measurements, LIDAR measurements, disparity measurements, etc., from one or more sensors 104 and/or from one or more external sensors. As described above, the sensor measurements (e.g., captured depth measurements, images, etc.) may be captured from the sensor(s) 104 included in the electronic device 102 or may be captured from one or more remote sensor(s).

In some configurations, the measurement obtainer 114 may request and/or receive one or more sensor measurements (e.g., depth measurements, stereoscopic image data, disparity measurements, LIDAR measurements, ToF measurements, image frames, etc.). For example, the measurement obtainer 114 may request and/or receive one or more sensor measurements from a remote device (e.g., external sensors(s), remote server, remote electronic device, etc.) via the communication interface 108.

In some configurations, the processor 112 may include and/or implement a pose information obtainer 118. The pose information obtainer 118 may obtain pose information regarding the orientation (e.g., pitch, yaw, roll, tilt, etc.), position (e.g., position in a 3D grid), and/or motion of the one or more sensors 104, one or more optical systems 106, and/or the electronic device 102. For example, the pose information obtainer 118 may receive motion and/or rotation measurements from one or more sensors 104. For instance, an accelerometer (e.g., 6-axis accelerometer) may be coupled to a stereoscopic camera (e.g., two sensors 104 and/or optical systems 106). The accelerometer may provide motion measurements to the pose information obtainer 118. In some configurations, the pose information obtainer 118 may obtain a position and/or orientation (e.g., a location and/or pointing direction) of the sensor(s) 104 and/or optical system(s) 106 based on the motion and/or rotation measurements. For example, the pose information obtainer 118 may integrate acceleration and/or rotation measurements to determine the velocity (e.g., translational velocities in 3 dimensions and/or rotational velocities in 3 dimensions) and/or position of the sensor(s) 104, optical system(s) 106, and/or the electronic device 102. In some approaches, the orientation and/or position of a motion sensor 104 may be transformed (e.g., rotated and/or translated) to the orientation and/or position of image sensor(s) 104 and/or optical system(s) 106. In some configurations, position and/or orientation (e.g., pointing direction) may be determined based on one or more images (e.g., stereoscopic images).

In some configurations, the pose information may indicate position and/or orientation of the sensor(s) 104, of the optical system(s) 106 and/or of the electronic device 102. For example, the pose information obtainer 118 may determine a camera position (e.g., a camera center, $x_k$) and/or a sensor position (e.g., a sensor pixel, $v_k$) based on the pose information. The camera position may indicate position and/or orientation of a camera. For example, the camera position may indicate a camera center (e.g., focal point). The sensor position may indicate a particular sample location (e.g., a particular pixel location) and/or orientation of the sensor. In some configurations, one or more camera parameters and/or sensor parameters (e.g., intrinsics such as focal center) may be determined by camera calibration. The camera calibration may be a one-time offline procedure.

In some configurations, the pose information obtainer 118 may determine one or more voxels based on the pose information (e.g., based on the camera position and/or the sensor position) For example, the pose information obtainer 118 may determine a ray based on the pose information that intersects with one or more voxels in a 3D grid. Additionally or alternatively, the pose information obtainer 118 may determine a shape (e.g., cone, a pyramid, a trapezoidal pyramid, etc.) based on the pose information that includes one or more voxels in a 3D grid. For example, an environment may be represented as a 3D grid of voxels or cells. The pose information obtainer 118 may determine one or more voxels that intersect with a ray originating from a depth sensor and/or one or more voxels included in a cone originating from a depth sensor (e.g., stereoscopic camera). In some configurations, the voxels that intersect with the ray and/or the voxels included within the cone may be indexed with a local index. The local index may be different from a global index (of all voxels in the 3D grid, for example). More detail is given in connection with one or more of FIGS. 3 and 4.

In some configurations, the processor 112 may include and/or implement a mapper 116. The mapper 116 may produce one or more maps. For example, the mapper 116 may determine one or more voxel occupancy probability distributions (e.g., a set of probability distributions) respectively corresponding to one or more voxels (e.g., a set of voxels) based on the sensor measurements (e.g., depth measurements, disparity measurements, etc.). Each of the probability distributions may represent a probability of occupancy of a voxel over a range of occupation densities (e.g., from completely empty (e.g., 0) to completely occupied (e.g., 1)). Accordingly, the map may be uncertainty-aware. The range may include partial occupation densities (e.g., fractional densities, a quarter occupied, half occupied, 0.25, 0.5, 0.75, etc.). The range may be a continuous range between completely empty (e.g., 0) and completely occupied (e.g., 1) in some configurations. For example, the continuous range may allow each probability distribution to represent any occupation density between 0 and 1. For instance, the range may not be discretized into a set of discrete values in some configurations. In other configurations, the range may be discretized. In some configurations, the mapper 116 may determine the voxel occupancy probability distribution(s) as described in connection with one or more of FIGS. 2 and 5-8.

In some approaches, determining the one or more voxel occupancy probability distributions may be based on an inverse cause model. Additionally or alternatively, determining the set of probability distributions may be based on Bayes' rule. In some approaches, determining the set of probability distributions may be based on a fusion (e.g., combination) of measurements at different times and/or from different sensors. For example, some configurations of the systems and methods disclosed herein may be agnostic to the source of measurement (e.g., the sensor it comes from). Accordingly, measurements from different sensors may be fused.

In some configurations, the mapper 116 may determine one or more values based on the one or more voxel occupancy probability distributions. For example, the mapper 116 may determine a first moment, a mean, an expected value, or an average for a voxel occupancy probability distribution (e.g., for each of the one or more voxel occupancy probability distributions). In some approaches, the mapper 116 may determine the first moment by performing an integration based on a voxel occupancy probability distribution.

In some configurations, the mapper 116 may determine one or more confidence values respectively corresponding to one or more voxels (of a 3D grid, for example). Each confidence value may indicate a confidence that a voxel is occupied (e.g., occupied in accordance with the voxel occupancy probability distribution, occupied at an occupation density, occupied at a mean of the voxel occupancy probability distribution, etc.). In some configurations, the confidence value may be the second moment (e.g., variance) of the voxel occupancy probability distribution for the corresponding voxel. In some configurations, the confidence value may be the standard deviation of the voxel occupancy probability distribution for the corresponding voxel. In some approaches, one or more of the voxel occupancy probability distributions, the first moment, mean, expected value, average, second moment, confidence, density, etc., may be stored in the memory 122.

In some configurations, the mapper 116 may update the set of probability distributions. Updating each of the set of probability distributions may include multiplying a previous probability distribution with an affine function. For example, mapping recursion in accordance with some approaches of the systems and methods disclosed here may provide a simple updating (e.g., recursion) operation. Without the approach provided by the systems and methods disclosed herein, attempting to achieve a similar accuracy may require the performance of expensive integrations (e.g., PDF marginalization) at every step.

In some approaches, updating the set of probability distributions may be based on Bayes' rule and/or an inverse cause model. In some approaches, updating the set of probability distributions may be based on a fusion (e.g., combination) of measurements at different times and/or from different sensors.

In accordance with some configurations of the systems and methods disclosed herein, mapping and/or updating may be accomplished in accordance with one or more of Equations (1)-(4):

$$p(\theta^i \mid z_{0:k}, xv_{0:k}) = \eta(a\theta^i + b)p(\theta^i \mid z_{0:k-1}, xv_{0:k-1}) \quad (1)$$

$$\eta = \frac{1}{m_{k-1}^i(1 - m_{k-1}^i)} \quad (2)$$

$$a = (1 - m_{k-1}^i)Pr(c_k = c^{i^l} \mid m_{k-1}, z_k, xv_k) - \quad (3)$$
$$m_{k-1}^i \sum_{r=0, i^l+1:Y} Pr(c_k = c^r \mid m_{k-1}, z_k, xv_k)$$

$$b = m_{k-1}^i(1 - m_{k-1}^i)p_{rand} + \quad (4)$$
$$m_{k-1}^i(1 - m_{k-1}^i) \sum_{r=1:i^l-1} Pr(c_k = c^r \mid m_{k-1}, z_k, xv_k) +$$
$$m_{k-1}^i \sum_{r=0, i^l+1:Y} Pr(c_k = c^r \mid m_{k-1}, z_k, xv_k)$$

In Equations (1)-(4), $\theta^i$ is the true (unknown) density of the i-th voxel. $\theta$ is a set of all $\theta^i$ (e.g., a set of occupation densities in a map). $m^i$ is an estimate of a $\theta^i$ and m is a set of all $m^i$. In some approaches, the belief $m_{k-1}^i$ may be left as a random variable (and both the mean and variance may be accounted for) in accordance with Bayesian statistics. An example of $m_k^i$ may be a beta distribution (see Equations (8), (9), and (10) below). $x_k$ is a camera position at instance k. $v_k$ is a sensor position in 3D at instance k. $xv_k$ denotes a ray passing through $x_k$ and $v_k \cdot z_k$ is an observation (e.g., measurement) at instance k (e.g., depth or disparity). $c_k$ is the cause (e.g., the voxel that the ray has bounced back from). $p_{rand}$ denotes the probability of getting spurious measurements. It should also be noted that $i^l$ is a local index of the voxel. It should be noted that the instance k may or may not correspond to a particular time. For example, measurements from two instances k may be taken at the same or different times and/or may be taken from the same or different sensors (e.g., from the same sensor at different times, from different sensors at the same time, or from different sensors at different times).

In accordance with some configurations of the systems and methods disclosed herein, $\eta(a\theta^i+b)$ is an affine function that may be multiplied with the voxel occupancy probability distribution (e.g., PDF) at a time step (e.g., each time step, every time step, etc.) to generate the voxel occupancy probability distribution (e.g., PDF) at the next time step. $p(\theta^i|z_{0:k-1}, xv_{0:k-1})$ may represent the voxel occupancy probability distribution (e.g., main PDF). For example, $p(\theta^i|z_{0:k-1}, xv_{0:k-1})$ may describe the probability of an occupancy level at voxel i given the past data (e.g., all observations and camera locations so far).

$$\eta = \frac{1}{m_{k-1}^i(1 - m_{k-1}^i)}$$

or eta is the normalization constant. The normalization constant may ensure that the voxel occupancy probability distribution is a valid PDF (e.g., that the area under the curve is one). $Pr(c_k=c^{i^l}|m_{k-1}, z_k, xv_k)$ may represent the "inverse cause model." Basically, this describes the probability of a given voxel being a cause, given the map, final measurement, and final pose.

$$\sum_{r=0, i^l+1:Y} Pr(c_k = c^r \mid m_{k-1}, z_k, xv_k)$$

is a summation over the "inverse cause models" for all voxels beyond the voxel i. (or for all outer voxels beyond the voxel under consideration).

$$\sum_{r=0:i^l-1} Pr(c_k = c^r \mid m_{k-1}, z_k, xv_k)$$

is a summation over "inverse cause models" for all voxels before the voxel i (or for all inner voxels before the voxel under consideration, between voxel i and the camera, etc.).

Accordingly, $p(\theta^i|z_{0:k}, xv_{0:k})$ may be a probability distribution corresponding to a voxel or a voxel occupancy probability distribution. This probability distribution may represent probability of occupancy of the voxel over a range of occupation densities. The range of occupation densities may include partial occupation densities (e.g., ¼ occupied by an object, ½ occupied by an object, etc.). As illustrated in Equation (1), updating each probability distribution may include multiplying a previous probability distribution with an affine function.

In some configurations, the electronic device 102 (e.g., processor 112) may perform one or more operations based on one or more voxel occupancy probability distributions (e.g., a set of voxel occupancy probability distributions). For example, the electronic device 102 may store the one or more voxel occupancy distributions (in memory 122, for example). Additionally or alternatively, the electronic device 102 may send the one or more voxel occupancy probability distributions to another device (via the communication interface(s) 108, for example).

In some configurations, the electronic device 102 (e.g., processor 112) may produce an environmental map based on the set of voxel occupancy probability distributions. For example, the electronic device 102 (e.g., processor 112, mapper 116, etc.) may produce an environmental map of voxels with corresponding occupancies (e.g., levels of occupancy), voxel occupancy probability distributions, probabilities of occupancy, and/or confidence values. The environmental map may accordingly indicate probable locations of one or more objects in the environment.

A robust planner may utilize the notion of uncertainty to make decisions regarding collision avoidance or path planning. Uncertainty may refer to the voxel occupancy probability distribution on the density from which useful information may be extracted (such as "confidence" in the reported value, for example). In some configurations, the electronic device 102 (e.g., processor 112) may plan a path based on the one or more voxel occupancy probability distributions (e.g., the set of voxel occupancy probability distributions). For example, the electronic device 102 may plan a path (e.g., route) to avoid one or more obstacles indicated by the set of voxel occupancy probability distributions (e.g., environmental map). For instance, the electronic device 102 may be and/or may be included in an automobile that plans a path around obstacles for autonomous driving and/or assisted driving (e.g., collision avoidance). In another example, the electronic device 102 may be and/or may be included in an aircraft (e.g., drone) that plans a path around obstacles. In another example, the electronic device 102 may be and/or may be included in a robot that plans a path around obstacles.

In some configurations, the electronic device 102 (e.g., processor 112) may control a vehicle based on the set of voxel occupancy probability distributions. For example, the electronic device 102 (e.g., processor 112) may execute the planned path. For example, the electronic device 102 (e.g., processor 112) may operate (and/or may provide instructions for the operation of) one or more movement mechanisms (e.g., drive train, brakes, propellers, jets, wheels, tracks, appendages, etc.) to move the electronic device 102 and/or another object (e.g., remote device) along a path that avoids obstacles.

In some configurations, the electronic device 102 (e.g., processor 112) may utilize one or more cost functions based on the set of voxel occupancy probability distributions. For example, the electronic device 102 may utilize one or more cost functions that penalize the density (e.g., how likely each voxel is occupied) and/or that penalize a level of confidence (e.g., uncertainty). In some configurations, these cost functions may be utilized in planning a path. Penalizing based on a level of confidence (e.g., confidence value, variance, etc.) may be beneficial. For example, a case may occur where one or a few measurements (and/or measurements from unreliable angles, etc.) have led to a determination that a given voxel is empty. However, since there is high uncertainty associated with the voxel (due to a lack of numerous reliable measurements), it may be unsafe to move to that voxel. The above cost function may be utilized to implement this planning behavior by relying on the mapping approach of some configurations of the systems and methods disclosed herein. Accordingly, the voxel occupancy probability distribution (e.g., posterior) may be used for planning in some configurations.

It should be noted that one or more of the operations described herein may be performed for one or more sets of measurements. For example, the processor 112 may perform one or more of the operations described herein for multiple sets of measurements over time.

It should be noted that one or more of the elements or components of the electronic device 102 may be combined and/or divided. For example, the measurement obtainer 114 and the mapper 116 may be combined. Additionally or alternatively, one or more the measurement obtainer 114 and/or the mapper 116 may be divided into elements or components that perform one or more subsets of the operations thereof.

Further detail regarding mapping in accordance with some configurations of the systems and methods disclosed herein is given as follows. Mapping may be defined as finding a voxel occupancy probability distribution (e.g., $p(\theta^i|z_{0:k},xv_{0:k})$ in accordance with the notation given above). One objective of the systems and methods disclosed herein may be to find the voxel occupancy probability distribution. In other words, the electronic device 102 may estimate the occupancy level of each voxel (e.g., voxel i in the above expression) given all the data. Data may include all observations (e.g., measurements, depth measurements, etc.) and pose information (e.g., position and/or orientation) obtained so far (by the electronic device 102, vehicle, robot, etc., for example). It should be noted that in some configurations, each camera pixel (of a stereoscopic camera, for example) may be treated as a separate depth sensor. In a more general case, measurements can come from one or more different range sensors such as stereoscopic cameras, LIDAR, sonar, radar, etc.

One benefit of the systems and methods disclosed herein is that the inverse cause model may work well even for noisy measurement techniques (e.g., stereoscopic camera depth sensing, sonar, ultrasound sensors, etc.). Some noisy measurement techniques may be substantially less expensive to implement than some more accurate measurement techniques (e.g., LIDAR). While LIDAR may be implemented in some configurations, some expense may be avoided by implementing cheaper depth sensing techniques (e.g., stereoscopic camera depth sensing, sonar, ultrasound, etc.) with the inverse cause model as described herein.

Another benefit of some configurations of the systems and methods disclosed herein is the capacity to build probability (e.g., uncertainty)-rich maps. Another benefit is the ability to incorporate the inverse cause model. For example, some configurations of the systems and methods disclosed herein may provide heuristic-free computation of the inverse cause model, which may lead to higher mapping accuracy in comparison with other approaches. For example, the inverse cause model may provide better accuracy than inverse sensor models that rely on heuristics. Some configurations of the systems and methods disclosed herein may perform mapping without using heuristics (e.g., arbitrary rules for assigning occupancy values). Yet another benefit may include a computationally cheap and efficient update rule (e.g., a multiplication as illustrated in Equation (1)). Some configurations of the systems and methods disclosed herein may function in moving environments (e.g., in a vehicle or robot moving through an environment). Some configurations of the systems and methods disclosed herein may be implemented with passive depth sensing (e.g., without projecting an active pattern).

Some approaches to mapping in accordance with some configurations of the systems and methods disclosed herein may be given as follows. Equation (5) may be used in deriving the inverse cause model. Equation (5) illustrates that given the cause (e.g., the voxel that caused light to bounce to the sensor), the last measurement (at instance k) is irrelevant.

$$p(\theta^i \mid c = c^r, z_{0:k}, xv_{0:k}) = \tag{5}$$

$$\frac{p(z_k \mid \theta^i, c = c^r, z_{0:k-1}, xv_{0:k})p(\theta^i \mid c = c^r, z_{0:k-1}, xv_{0:k})}{p(z_k \mid c = c^r, z_{0:k-1}, xv_{0:k})} =$$

$$\frac{p(z_k \mid c = c^r, z_{0:k-1}, xv_{0:k})p(\theta^i \mid c = c^r, z_{0:k-1}, xv_{0:k})}{p(z_k \mid c = c^r, z_{0:k-1}, xv_{0:k})} =$$

$$p(\theta^i \mid c = c^r, z_{0:k-1}, xv_{0:k}) = p(\theta^i \mid c = c^r, z_{0:k-1}, xv_{0:k-1})$$

In Equation (5), $p(\theta^i|c=c^r,z_{0:k},xv_{0:k})$ is a posterior probability on the occupancy level of the i-th voxel, and r denotes a local voxel index.

Equation (6) illustrates the probability of a voxel R being the cause given the map.

$$Pr(c_k = c^R \mid m_{k-1}, xv_k) = (1 - p_{rand})m_{k-1}^{g(x,v,R)} \sum_{r=1}^{R-1} \left(1 - m_{k-1}^{g(x,v,R)}\right) \tag{6}$$

Equation (7) further illustrates the probability of a voxel R being the cause given the map and a single-voxel true density.

$$Pr(c_k = c^R \mid \theta^i, m_{k-1}, xv_k) = \begin{cases} Pr(c_k = c^R \mid m_{k-1}, xv_k), & \text{if } R < i \\ (1 - p_{rand})\theta^i \prod_{r=1, r \neq i}^{R-1} \left(1 - m_{k-1}^{g(x,v,r)}\right), & \text{if } R \geq i \end{cases} \tag{7}$$

In Equations (6)-(7), $p_{rand}$ denotes the probability of getting spurious measurements and g refers to local-global coordinate transformations: $i=g(xv_k,R)$, $R=g^{-1}(xv_k,i)$. Local-global coordinate transformations are described in additional detail in connection with FIGS. 3 and 4.

Further detail regarding some configurations of the systems and methods disclosed herein and map construction and/or update rules are given as follows.

Equation (8) illustrates how the law of total probability and Bayes' rule may be utilized to make the inverse cause model appear. The inverse cause model may be utilized in mapping as described herein.

$$p(\theta^i \mid z_{0:k}, xv_{0:k}) = \qquad (8)$$

$$\sum_{r=-1:Y} p(\theta^i \mid c_k = c^r, z_{0:k}, xv_{0:k}) Pr(c_k = c^r \mid z_{0:k}, xv_{0:k}) =$$

$$\sum_{r=-1:Y} p(\theta^i \mid c_k = c^r, z_{0:k-1}, xv_{0:k}) Pr(c_k = c^r \mid z_{0:k}, xv_{0:k}) =$$

$$\sum_{r=-1:Y} \frac{Pr(c_k = c^r \mid \theta^i, z_{0:k-1}, xv_{0:k})}{Pr(c_k = c^r \mid z_{0:k-1}, xv_{0:k})} Pr(c_k = c^r \mid z_{0:k}, xv_{0:k})$$

$$p(\theta^i \mid z_{0:k-1}, xv_{0:k}) = \sum_{r=-1:Y} \frac{Pr(c_k = c^r \mid \theta^i, z_{0:k-1}, xv_{0:k})}{Pr(c_k = c^r \mid z_{0:k-1}, xv_{0:k})}$$

$$Pr(c_k = c^r \mid z_{0:k}, xv_{0:k}) p(\theta^i \mid z_{0:k-1}, xv_{0:k-1}) =$$

$$\sum_{r=-1:Y} \frac{Pr(c_k = c^r \mid \theta^i, m_{k-1}, xv_k)}{Pr(c_k = c^r \mid z_{0:k-1}, xv_{0:k})} Pr(c_k = c^r \mid z_{0:k}, xv_{0:k})$$

$$p(\theta^i \mid z_{0:k-1}, xv_{0:k-1}) = \sum_{r=-1:Y} \frac{Pr(c_k = c^r \mid \theta^i, m_{k-1}, xv_k)}{Pr(c_k = c^r \mid m_{k-1}, xv_k)}$$

$$Pr(c_k = c^r \mid m_{k-1}, z_k, xv_k) p(\theta^i \mid z_{0:k-1}, xv_{0:k-1})$$

In Equation (8), it should be noted that the superscript i may denote the global index of a voxel (e.g., the index of the voxel in the whole map).

Equation (9) illustrates how the cause model may be plugged in Equation (6) and/or Equation (7) may be utilized here.

$$p(\theta^i \mid z_{0:k}, xv_{0:k}) = \qquad (9)$$

$$\sum_{r=-1:Y} \frac{Pr(c_k = c^r \mid \theta^i, m_{k-1}, xv_k)}{Pr(c_k = c^r \mid m_{k-1}, xv_k)} Pr(c_k = c^r \mid m_{k-1}, z_k, xv_k)$$

$$p(\theta^i \mid z_{0:k-1}, xv_{0:k-1}) =$$

$$\left[ p_{rand} + \sum_{r=1:i^l-1} Pr(c_k = c^r \mid m_{k-1}, z_k, xv_k) + \right.$$

$$\frac{\theta^i}{m_{k-1}^i} Pr\!\left(c_k = c^{i^l} \mid m_{k-1}, z_k, xv_k\right) + \frac{1-\theta^i}{1-m_{k-1}^i}$$

$$\left. \sum_{r=0:i^l+1:Y} Pr(c_k = c^r \mid m_{k-1}, z_k, xv_k) \right] p(\theta^i \mid z_{0:k-1}, xv_{0:k-1}) =$$

$$\frac{1}{m_{k-1}^i (1 - m_{k-1}^i)} \left[ m_{k-1}^i (1 - m_{k-1}^i) p_{rand} + \right.$$

$$m_{k-1}^i (1 - m_{k-1}^i) \sum_{r=1:i^l-1} Pr(c_k = c^r \mid m_{k-1}, z_k, xv_k) +$$

$$(1 - m_{k-1}^i) \theta^i Pr\!\left(c_k = c^{i^l} \mid m_{k-1}, z_k, xv_k\right) + m_{k-1}^i (1 - \theta^i)$$

$$\left. \sum_{r=0:i^l+1:Y} Pr(c_k = c^r \mid m_{k-1}, z_k, xv_k) \right] p(\theta^i \mid z_{0:k-1}, xv_{0:k-1})$$

Equation (10) illustrates some simplification of the recursion equation.

$$p(\theta^i \mid z_{0:k}, xv_{0:k}) = \frac{1}{m_{k-1}^i (1 - m_{k-1}^i)} \left[ m_{k-1}^i (1 - m_{k-1}^i) p_{rand} + \right. \qquad (10)$$

$$m_{k-1}^i (1 - m_{k-1}^i) \sum_{r=0:i^l-1} Pr(c_k = c^r \mid m_{k-1}, z_k, xv_k) +$$

$$(1 - m_{k-1}^i) \theta^i Pr\!\left(c_k = c^{i^l} \mid m_{k-1}, z_k, xv_k\right) +$$

$$\left. m_{k-1}^i (1 - \theta^i) \sum_{r=0:i^l+1:Y} Pr(c_k = c^r \mid m_{k-1}, z_k, xv_k) \right]$$

$$p(\theta^i \mid z_{0:k-1}, xv_{0:k-1}) = \frac{1}{m_{k-1}^i (1 - m_{k-1}^i)} \left[ m_{k-1}^i (1 - m_{k-1}^i) p_{rand} + \right.$$

$$m_{k-1}^i (1 - m_{k-1}^i) \sum_{r=1:i^l-1} Pr(c_k = c^r \mid m_{k-1}, z_k, xv_k) +$$

$$m_{k-1}^i \sum_{r=0:i^l+1:Y} Pr(c_k = c^r \mid m_{k-1}, z_k, xv_k) +$$

$$(1 - m_{k-1}^i) \theta^i Pr\!\left(c_k = c^{i^l} \mid m_{k-1}, z_k, xv_k\right) -$$

$$\left. m_{k-1}^i \theta^i \sum_{r=0:i^l+1:Y} Pr(c_k = c^r \mid m_{k-1}, z_k, xv_k) \right]$$

$$p(\theta^i \mid z_{0:k-1}, xv_{0:k-1}) = \lfloor a\theta^i + b \rfloor p(\theta^i \mid z_{0:k-1}, xv_{0:k-1})$$

As illustrated in Equation (10), some approaches of mapping may be expressed in accordance with Equations (1)-(4). Accordingly, mapping recursion (e.g., updating) may be an affine function times a previous posterior. In some configurations, consistency verification may be carried out in accordance with Equations (11) and (12).

$$\int_0^1 p(\theta^i \mid z_{0:k}, xv_{0:k}) = \int_0^1 \eta(a\theta^i + b) p(\theta^i \mid z_{0:k-1}, xv_{0:k-1}) = \qquad (11)$$

$$\eta a E[\theta^i \mid z_{0:k-1}, xv_{0:k-1}] + \eta b = \eta a \hat{m}_{k-1}^i + \eta b$$

$$\eta a \hat{m}_{k-1}^i = 1 \Rightarrow \hat{m}_{k-1}^i = \frac{1 - \eta b}{\eta a} \qquad (12)$$

It can be demonstrated that Equations (11) and (12) are equivalent and hence the derivations are exact.

Figure 2:
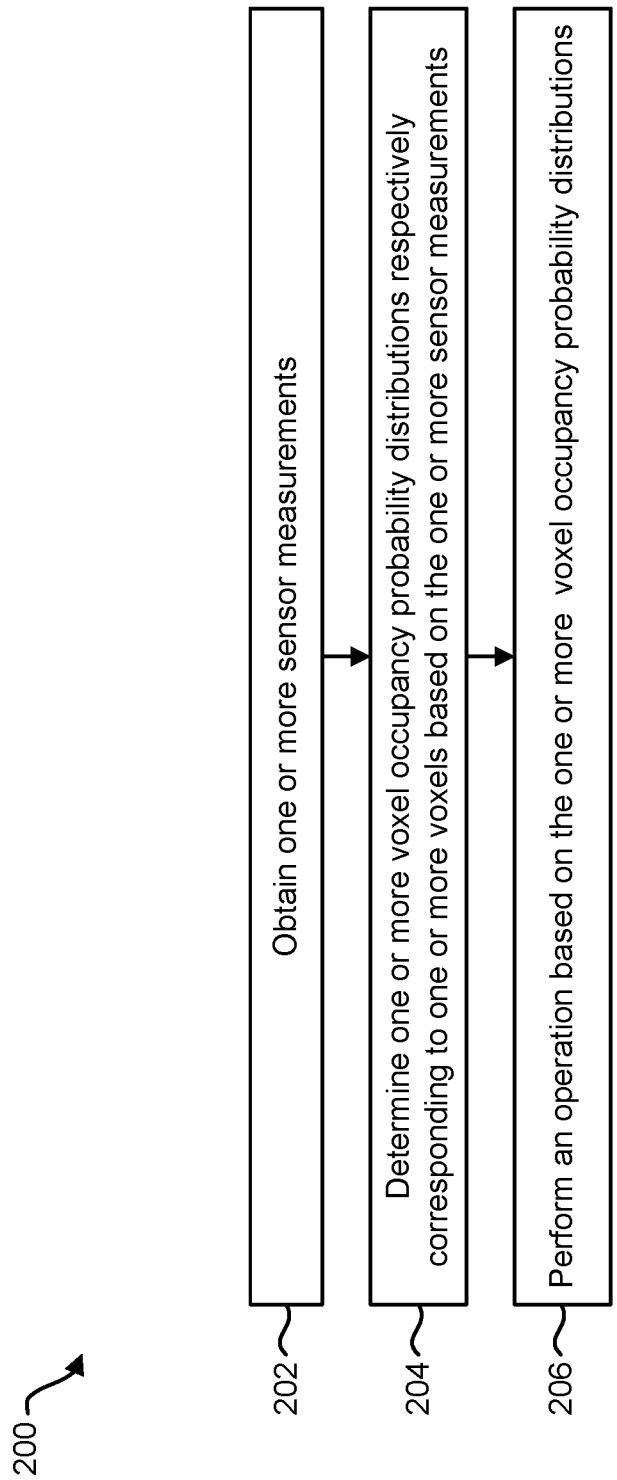
FIG. 2 is a flow diagram illustrating one configuration of a method for mapping an environment.

FIG. 2 is a flow diagram illustrating one configuration of a method 200 for mapping an environment. The method 200 may be performed by an electronic device (e.g., the electronic device 102 described in connection with FIG. 1).

The electronic device 102 may obtain 202 one or more sensor measurements (e.g., a set of sensor measurements). This may be accomplished as described in connection with FIG. 1. For example, the electronic device 102 may capture one or more sensor measurements (e.g., one or more sets of sensor measurements) with one or more sensors 104 and/or may receive one or more sensor measurements from one or more remote devices. The sensor measurement(s) may indicate one or more depth measurements (from a sensor or camera to an environment). In some configurations, one or more sensor measurements may indicate a depth to one or more objects, no measurement (e.g., no depth detected within sensor range, infinite depth, etc.), or spurious measurement (e.g., erroneous measurement, noise, etc.).

The electronic device 102 may determine 204 one or more voxel occupancy probability distributions (e.g., a set of voxel occupancy probability distributions) respectively corresponding to one or more voxels (e.g., a set of voxels) based on the one or more sensor measurements (e.g., a set of sensor measurements). This may be accomplished as described in connection with FIG. 1. For example, the electronic device 102 may determine (e.g., calculate, compute, etc.) a probability of occupancy of a voxel over a range of occupation densities, where the range includes partial occupation densities. In some configurations, determining 204 and/or updating the voxel occupancy probability distribution(s) may be based on an inverse cause model and/or Bayes' rule. Additionally or alternatively, determining 204 and/or updating the voxel occupancy probability distribution(s) may be based on any previous sensor measurement(s) and/or voxel occupancy probability distribution(s).

It should be noted that the term "previous" may refer to a sequence of computation and may or may not refer to a sequence of measurement in time. For example, a first set of sensor measurements (from a stereo camera, for instance) and a second set of sensor measurements (from ultrasound sensors, for instance) may be taken concurrently and/or simultaneously. The first set of sensor measurements may be first utilized to compute a voxel occupancy probability distribution followed by the second set of sensor measurements being utilized to update the voxel occupancy probability distribution. Accordingly, the first set of sensor measurements may be referred to as a "previous" set of sensor measurements, since it was utilized previous to the second set of sensor measurements for computation.

The electronic device 102 may optionally perform 206 an operation based on the one or more voxel occupancy probability distributions (e.g., set of voxel occupancy probability distributions). This may be accomplished as described in connection with FIG. 1. For example, the electronic device 102 may produce an environmental map based on the one or more voxel occupancy probability distributions. In some approaches, each voxel of the environmental map may have an associated probability distribution, density (e.g., occupancy level), and/or confidence. In another example, the electronic device 102 may store the set of voxel occupancy probability distributions. Additionally or alternatively, the electronic device 102 may send the set of voxel occupancy probability distributions to one or more other devices. Additionally or alternatively, the electronic device 102 may plan a path based on the set of voxel occupancy probability distributions. More detail on operations that may be performed based on the one or more voxel occupancy probability distributions is given in connection with one or more of FIGS. 1 and 4.

In some configurations, the electronic device 102 may determine one or more confidence values (e.g., a set of confidence values) respectively corresponding to the one or more voxels as described in connection with FIG. 1. Additionally or alternatively, the electronic device 102 may update each of the one or more voxel occupancy probability distributions. Updating the one or more voxel occupancy probability distributions may be based on a fusion of measurements at different times and/or from different sensors. Additionally or alternatively, updating the one or more voxel occupancy probability distributions may be based on multiplying a previous probability distribution with an affine function.

Figure 3:
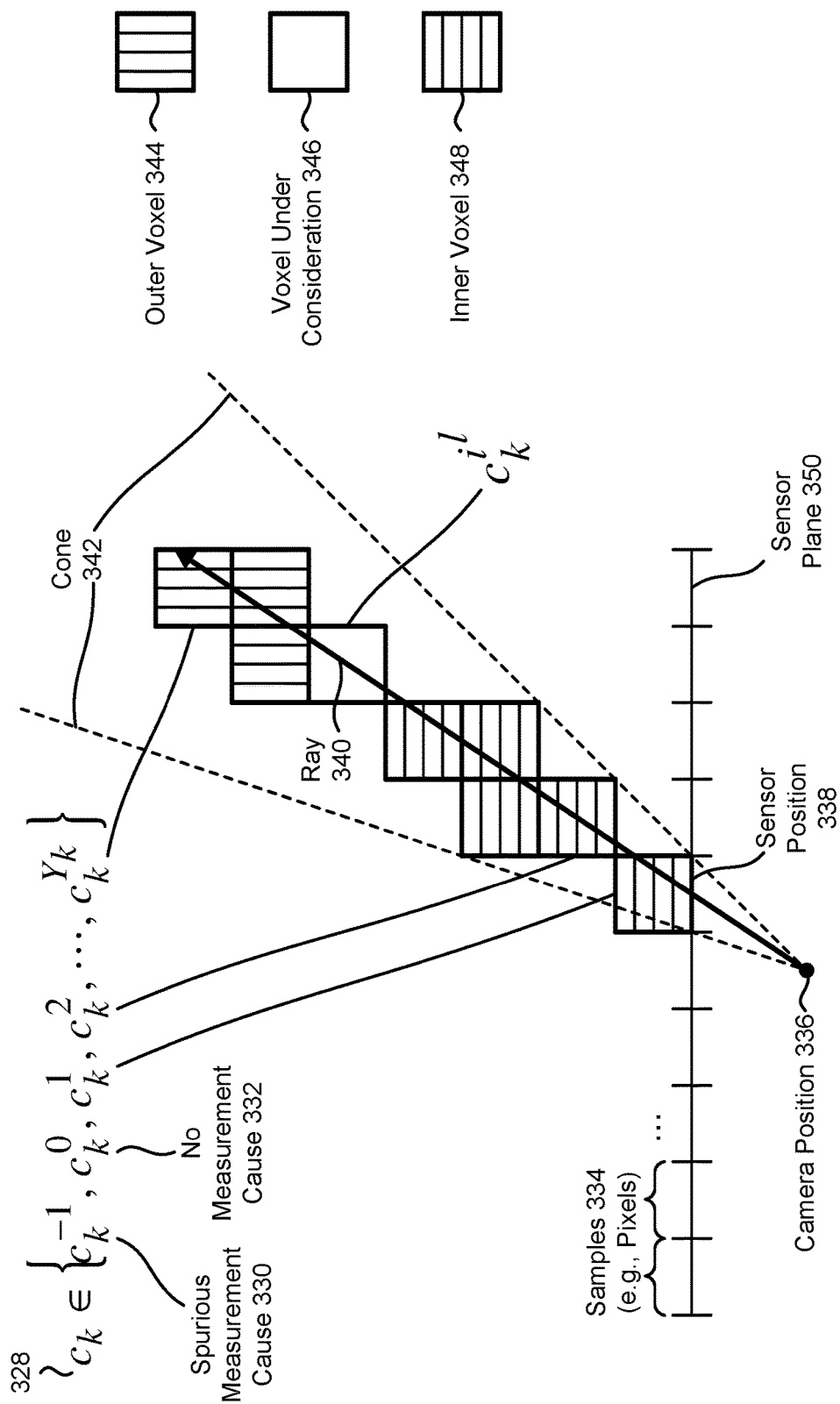
FIG. 3 is a block diagram illustrating an example of a depth sensor model that may be utilized in some configurations of the systems and methods disclosed herein.

FIG. 3 is a block diagram illustrating an example of a depth sensor model that may be utilized in some configurations of the systems and methods disclosed herein. In particular, FIG. 3 illustrates a cause variable 328 (e.g., correspondence variable). The cause variable 328 may be ordered by distance to or from the sensor (e.g., depth sensor, stereoscopic camera with disparity measurement, LIDAR, etc.). For example, FIG. 3 illustrates the cause variable 328 as being in ascending order depending on the depth (e.g., distance) from the sensor plane 350. The cause variable 328 may model the voxel from which a wave or particle (e.g., light ray, ultrasound wave, sonar wave, infrared, radar signal, etc.) has bounced to the sensor.

In this example, the cause variable 328 (for an observation-ray pair, for example) is denoted as $c_k \in \{c_k^{-1}, c_k^0, c_k^1, c_k^2, \ldots, c_k^{Y_k}\}$, where $c_k^{-1}$ represents a spurious measurement cause 330 (e.g., noise, incorrect measurement, etc.), $c_k^0$ represents a no measurement cause 332 (e.g., infinite distance and/or no measured depth to an object, etc.), and $c_k^1, \ldots, c_k^{Y_k}$ correspond to voxels with depths in ascending order.

As illustrated in FIG. 3, a ray 340 may be defined based on a camera position 336 (e.g., camera center) and a sensor position 338. The sensor position 338 may indicate a sample 334 (e.g., pixel) of a sensor. In some configurations, the sensor position 338 may correspond to the center of a sample 334. As illustrated in FIG. 3, a cone 342 (e.g., pyramid) may be defined based on the camera position 336 and the sensor position 338. One or more of the voxels that intersect with the ray 340 and/or one or more voxels within the cone 342 may cause the measurement for the sample 334 (e.g., pixel) at the sensor position 338). Accordingly, one or more of the voxels that intersect with the ray 340 and/or one or more voxels within the cone 342 may be considered in determining a voxel occupancy probability distribution. As illustrated in FIG. 3, the voxel occupancy probability distribution may depend on one or more inner voxels 348, a voxel under consideration 346 (e.g., $c_k^{i'}$), and/or one or more outer voxels 344. For example, Equations (1) and (3)-(4) illustrate how cause probabilities for inner voxels and/or outer voxels may be summed to determine a voxel occupancy probability distribution.

In some approaches, a measured depth (e.g., disparity) for the ray 340 (e.g., xv=(x, v)) may be denoted $z_k$. The electronic device 102 may obtain the measurement $z_k$ for one or more samples 334 (e.g., pixels). The electronic device 102 may determine and/or update one or more voxel occupancy probability distributions based on the measurement, the camera position 336, and the sensor position 338. This may be accomplished as described in connection with Equations (1)-(4).

It should be noted that one or more of the voxels that intersect with the ray 340 and/or one or more voxels within the cone 342 may be indexed according to a local index or coordinates (e.g., $i^r$) in some configurations. In some approaches, a map (e.g., voxel map, environmental map, etc.) may be indexed with a global index or coordinates. A voxel index-returning function may be expressed as j=g(xv, r), where j is the global voxel (e.g., cell) index and r is the local voxel (e.g., cell) index. For example, a voxel density estimate in the local index may correspond to a voxel density estimate in the global index as $m^j = m^{g(xv, r)}$. In some configurations, the electronic device 102 (e.g., processor 112, measurement obtainer 114, pose information obtainer 118, mapper 116, etc.) may convert (e.g., map) voxels between local and global indexes or coordinates.

Figure 4:
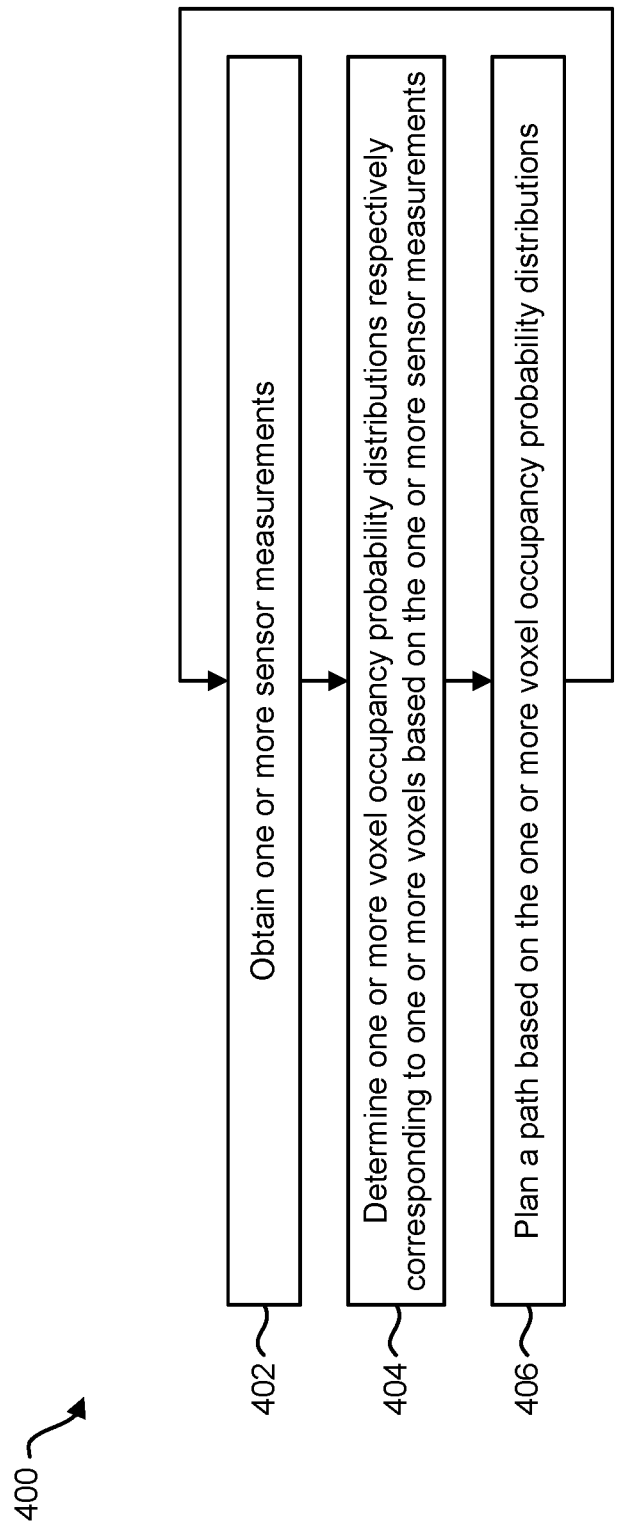
FIG. 4 is a flow diagram illustrating one configuration of a method for planning a path.

FIG. 4 is a flow diagram illustrating one configuration of a method 400 for planning a path. The method 400 may be performed by an electronic device (e.g., the electronic device 102 described in connection with one or more of FIGS. 1-3).

The electronic device 102 may obtain 402 one or more sensor measurements (e.g., a set of sensor measurements). This may be accomplished as described in connection with one or more of FIGS. 1-3.

The electronic device 102 may determine 404 one or more voxel occupancy probability distributions (e.g., a set of voxel occupancy probability distributions) respectively corresponding to one or more voxels (e.g., a set of voxels) based on the one or more sensor measurements (e.g., a set of sensor measurements). This may be accomplished as described in connection with one or more of FIGS. 1-3.

The electronic device 102 may plan 406 a path based on the one or more voxel occupancy probability distributions (e.g., set of voxel occupancy probability distributions). This may be accomplished as described in connection with one or more of FIGS. 1 and 2.

In some configurations, obtaining 402 one or more sensor measurements, determining 404 one or more voxel occupancy probability distributions, and/or planning 406 a path may be performed in accordance with the following. It should be noted that some of the notation for Equations (13)-(42) may be similar to or different than that of Equations (1)-(12).

Some configurations of the systems and methods disclosed herein may enable mapping and planning (e.g., concurrent or simultaneous mapping and planning) on occupancy grids. Occupancy grids are a framework for creating a map of the environment. As described herein, an electronic device 102 (e.g., robot, drone, vehicle, smart phone, etc.) may produce a map. Additional detail regarding occupancy grids from a planning perspective is given as follows. Mapping approaches that provide richer data (e.g., a map) are given herein. One or more of the mapping approaches may be utilized for the purpose of planning and collision avoidance.

In some approaches for occupancy grid mapping, each cell contains a single number representing the probability of cell being occupied (e.g., fully occupied or completely empty). In accordance with one or more of the configurations disclosed herein for a planning-oriented representation, a probability distribution may be maintained over this number. This may allow a planner to reason about acquisition of the future observation. Planning with this confidence-aware map may lead to active perception maneuvers that while guiding an object (e.g., vehicle, robot, drone, etc.) toward the goal may aim at increasing the confidence in parts of the map that are relevant to accomplishing the task.

For example, consider an electronic device 102 moving (e.g., quadrotor flying, vehicle driving, etc.) in an obstacle-laden environment, tasked to reach a goal, while mapping the environment with a forward-facing stereo camera. To carry out the sense-and-avoid task and ensure the safety of the system by avoiding collisions, the electronic device 102 may create a representation of obstacles, referred to as the map, and incorporate it in the planning framework. Some configurations of the systems and methods disclosed herein may be concerned with the design of such a framework where there is tight integration between mapping and planning. One advantage of such tight integration and joint design of these two blocks is that not only can mapping provide the information for the planning (or navigation), but also the navigation may generate maneuvers that lead to better mapping and more accurate environment representation.

In some frameworks, grid-based structures may represent the environment when dealing with the stereo cameras. In some approaches, each grid voxel contains Boolean information regarding whether the cell is free or occupied by obstacles. In a richer format, each voxel may include the probability of the cell being occupied. Such representation may be generated assuming that the actions are given based on some map-independent cost. In a joint design of planning and mapping, however, one objective of planning may be the accuracy of generated map. Characterizing a map accurately and how it is affected by the output of the planner may be one challenge in such a joint design.

Some configurations of the systems and methods disclosed herein may provide a planning framework where active perception and/or mapping may be accomplished via incorporating mapping accuracy into the planning. The mapping framework (whose future evolution under planner actions, for example) may be predicted accurately. Some configurations of the systems and methods disclosed herein may be capable of coping with maps where each voxel might be partially occupied by obstacles.

As follows, some approaches are reviewed. Additional detail on a sensor model for a stereo camera is then given. A mapping framework is also described. An example of a planning algorithm is also given.

Density map: let $G=[G^1, \ldots, G^M]$ be a grid overlaid on the 3D environment, where $G^i \in R^3$ is a 3D point representing the center of the i-th voxel of the grid. Density map $m=[m^1, \ldots, m^M]$ may be defined as a set of values over this grid, where $m^i \in [0,1]$ represents the density of environment obstacles falling under the i-th voxel of the grid. For example, $m^i=0.3$ if 30 percent of the i-th voxel is occupied by obstacles. It should be noted that the terms "density" and "occupancy level" may be used interchangeably herein. The special case of density maps are occupancy grid maps where $m^i \in \{0,1\}$, which may be a good approximation of density when voxels are small. The variable $m^i$ may be overloaded with function $m^i[x]$ that returns the 3D location of the i-th voxel in the global coordinate frame.

Map belief: obtaining measurements via a noisy sensor may provide an estimate of the density values, rather than their exact values. The sensor measurement at the k-th time step may be denoted by $z_k$ and the sensor configuration at the k-th time step may be denoted with $xv_k$. Formulating the problem in a Bayesian framework, the information obtained from past measurements may be compressed as $z_{0:k}=\{z_0, \ldots, z_k\}$ and $xv_{0:k}=\{xv_0, \ldots, xv_k\}$ to create a probability distribution $b_k^m$ on all possible values of density as illustrated in Equation (13).

$$b_k^m = p(m|z_{0:k}, xv_{0:k}) \quad (13)$$

Some configurations of the systems and methods disclosed herein may provide a derived density-based ranging sensor model, recursive density mapping, and/or a map-enhancing motion planning scheme. The density-based ranging sensor model may be described as follows. Given the obstacles are described by a density grid, a ranging sensor model (which may be utilized for stereo camera, for example) may obtain a mapping h from a density map to range observations as illustrated in Equation (14).

$$z_k = h(xv_k, b_k^m) \quad (14)$$

Recursive density mapping may be described as follows. A recursive mapping scheme $\tau$ that updates the current density map based on the last measurements may be expressed as given in Equation (15).

$$b_{k+1}^m = \tau^m(b_k^m, z_{k+1}, xv_{k+1}) \quad (15)$$

Motion planning and active perception in density maps may be described as follows. A planning scheme that moves an object (e.g., robot, vehicle, drone, etc.) from start to goal, while incorporating the density map and taking actions that actively reduce uncertainty on the map to generate safer paths with lower collision probabilities may be expressed as given in Equation (16).

$$\pi^* = \underset{\Pi}{\operatorname{argmin}} J(x_k, b_k^m, \pi) \qquad (16)$$

Further detail regarding the density-based ranging sensor model, recursive density mapping, and motion planning is given as follows. A depth sensor (e.g., range sensor) when the environment representation is a density map may be modeled. In some configurations, the depth sensor may be a stereoscopic camera. It should be noted that the systems and methods disclosed herein may be implemented with other depth (e.g., range) sensors. A stereo camera is a passive sensor where the image from left and right cameras may be compared to produce a disparity image (e.g., to translate to disparity image). The disparity image may be converted to the depth measurement. For example, the electronic device 102 (e.g., measurement obtainer 114) may determine the disparity image and/or the depth based on the disparity image. The camera center may be denoted by x and the 3D location of the i-th pixel may be denoted by v. The ray emanating from x and passing through v may be denoted by xv=(x,v). An example of a ray is given in connection with FIG. 3. Denoting the distance of the closest obstacle from the camera along ray xv by r, the disparity z of this pixel, in the absence of noise, may be expressed as given in Equation (17).

$$z = r^{-1} f d_b \qquad (16)$$

In Equation (16), f is the camera's focal length and $d_b$ is the baseline between two cameras on the stereo rig. The stereo sensor model may be abstracted to the hypothetical "disparity sensor" model. Each pixel may be treated as a separate sensor and the disparity sensor model may be derived for the single pixel v (e.g., z=h(xv,b$^m$)) or may be equivalently represented by its likelihood p(z|xv,b$^m$).

A pixel cone is described as follows. Consider a 3D cone with an apex at x and boundaries defined by pixel v. This cone may be approximated by the ray xv going through point x and the center of pixel v. The pixel cone Cone(xv) refers to the set of voxels in map m that falls into the mentioned cone (or approximately a set of voxels that intersects with ray xv). The set of voxels may be denoted by C=Cone(xv), where C⊂m.

As described in connection with FIG. 3, for example, a cone 342 (illustrated with two lines) may be a cone associated with a given pixel v on the sensor plane 350 (e.g., image plane). The disparity measurement on pixel v may be affected by light coming from any of voxels in the pixel cone. For example, a measurement may be created by the reflection from a voxel.

Cause variables are described as follows. The disparity measurement on pixel v may be the result of light reflection from any of voxels in the cone C=Cone(xv). Therefore, any of these voxels may be a potential cause for the measurement. In the case that the environment map is perfectly known, the exact cause may be pinpointed by finding the closest obstacle to the camera center. However, when the knowledge about the environment is partial and probabilistic, a deduction about causes may be a probability distribution over all possible causes in the pixel cone C=Cone(xv). These causes may play an important role (as hidden variables) in deriving a sensor model for stochastic maps.

Local versus global indices are described as follows. For a given ray xv, the voxels along the ray may be ordered from the closest to the camera to the farthest from the camera. Let l∈{1, . . . , ‖C‖} denote the local index of the voxel on ray xv. Then the function g=γ(l,xv) may return the global index g of the voxel in the map.

Cause probability is described as follows. To derive a full sensor model, the voxel that was the cause for a given measurement may be considered. For a voxel c∈C(xv) to be the cause, two events may happen. One event, B$^c$, may indicate the event of light bouncing from the voxel. Another event, R$^c$, may indicates the event of light reaching the camera. A probability based on these events is given in Equation (17).

$$p(c|b^m) = Pr(B^c, R^c | b^m) = Pr(R^c | B^c, b^m) Pr(B^c | b^m) \qquad (17)$$

Computing the bouncing probability may rely on the fact that Pr(B$^c$|m$^c$)=m$^c$ by the definition of the density. In other words, the occupancy level of the voxel c may be the probability of the ray bouncing from that voxel. One assumption may be that the environment is texture-rich. Equation (18) may be written accordingly.

$$Pr(B^c | b^m) = \int_0^1 Pr(B^c | m^c, b^m) p(m^c | b^m) dm^c = \qquad (18)$$
$$\int_0^1 Pr(B^c | m^c) p(m^c | b^m) dm^c = \int_0^1 m^c, b^{m^c} dm^c = Em^c = \hat{m}^c$$

The reaching probability may be described as follows. For the ray emanating from voxel c to reach the image plane, the ray may go through all voxels on ray xv and not c. Let c$^l$ denote a local index of voxel c along the ray xv. For example, if c$^l$=g$^{-1}$(c,xv), then Equation (19) may be given as follows.

$$Pr(R^c | B^c, b^m) = \qquad (19)$$
$$(1 - Pr(B^{g(c^l-1,xv)} | b^m)) Pr(R^{g(c^l-1,xv)} | B^{g(c^l-1,xv)}, b^m) =$$
$$\prod_{l=1}^{c^l-1} (1 - Pr(B^{g(l,xv)} | b^m)) = \prod_{l=1}^{c^l-1} \left(1 - \hat{m}^{g(l,xv)}\right)$$

A sensor model with known cause is described as follows. Assuming the cause voxel for measurement z is known, the sensor model may be given as follows in Equation (20).

$$z = h(xv, c, n_z) = \|G^c - x\|^{-1} f b + n_z, n_z \sim N(0, R) \qquad (20)$$

In Equation (20), $n_z$ denotes the observation noise, which may be modeled as a zero-mean Gaussian with variance R. Alternatively, the observation model may be described in terms of pdfs as given in Equation (21).

$$p(z | xv, c) = N(\|G^c - x\|^{-1} f b, R) \qquad (21)$$

The sensor model with stochastic maps may be described as follows. The sensor model given a stochastic map may be computed by incorporating hidden cause variables into the formulation expressed in Equations (22)-(23).

$$p(z | xv; b^m) = \sum_{c \in C(xv)} p(z | xv, c; b^m) Pr(c | b^m) = \qquad (22)$$

$$\sum_{c \in C(xv)} N(\|G^c - x\|^{-1} fb, R) \hat{m}^c \prod_{l=1}^{c^l-1} \left(1 - \hat{m}^{g(l,xv)}\right)$$

A confidence-augmented grid map is described as follows. A mapping algorithm may be derived that can reason not only about the probability of collision at each cell, but also about the confidence level of this value. As a result, the algorithm may enable efficient prediction of the map that may be embedded in planning and result in safer plans.

Some assumptions and approximations are given as follows. One lemma may be that given the cause, the last measurement is irrelevant as illustrated in Equation (24).

$$p(m^i | c_k, z_{0:k}, xv_{0:k}) = \frac{p(z_k | m^i, c_k, z_{0:k-1}, xv_{0:k}) p(m^i | c_k, z_{0:k-1}, xv_{0:k})}{p(z_k | c_k, z_{0:k-1}, xv_{0:k})} \quad (24)$$
$$= \frac{p(z_k | c_k, z_{0:k-1}, xv_{0:k}) p(m^i | c_k, z_{0:k-1}, xv_{0:k})}{p(z_k | c_k, z_{0:k-1}, xv_{0:k})}$$
$$= p(m^i | c_k, z_{0:k-1}, xv_{0:k})$$
$$= p(m^i | c_k, z_{0:k-1}, xv_{0:k-1})$$

Bayesian update may be described as follows. Using the foregoing lemma and starting at $p(m^i|c_k, z_{0:k}, xv_{0:k})$, Equation (25) may be written as follows.

$$p(m^i | z_{0:k}, xv_{0:k}) = \sum_{c_k \in C(xv)} p(m^i | c_k, z_{0:k}, xv_{0:k}) Pr(c_k | z_{0:k}, xv_{0:k}) \quad (25)$$
$$= \sum_{c_k \in C(xv)} p(m^i | c_k, z_{0:k-1}, xv_{0:k}) Pr(c_k | z_{0:k}, xv_{0:k})$$
$$= \sum_{c_k \in C(xv)} \frac{Pr(c_k | m^i, z_{0:k-1}, xv_{0:k})}{Pr(c_k | z_{0:k-1}, xv_{0:k})}$$
$$Pr(c_k | z_{0:k}, xv_{0:k}) p(m^i | z_{0:k-1}, xv_{0:k})$$
$$= \sum_{c_k \in C(xv)} \frac{Pr(c_k | m^i, z_{0:k-1}, xv_{0:k})}{Pr(c_k | z_{0:k-1}, xv_{0:k})}$$
$$Pr(c_k | z_{0:k}, xv_{0:k}) p(m^i | z_{0:k-1}, xv_{0:k-1})$$

Then, relying on the compression below (based on sufficient statistics, for example), Equation (26) may be written.

$$p(c_k, m^i | z_{0:k-1}, xv_{0:k-1}) = p(c_k, m^i | b_{k-1}^m),$$
$$Pr(c_k | z_{0:k}, xv_{0:k}) = Pr(c_k | b_{k-1}^m, z_k, xv_k) \quad (26)$$

Equation (25) may be re-written as given in Equation (27).

$$p(m^i | z_{0:k}, xv_{0:k}) = \sum_{c_k \in C(xv)} \frac{Pr(c_k | m^i, b_{k-1}^m, xv_k)}{Pr(c_k | b_{k-1}^m, xv_k)} \quad (27)$$
$$Pr(c_k | b_{k-1}^m, z_k, xv_k) p(m^i | z_{0:k-1}, xv_{0:k-1})$$

The ratio in Equation (27) may describe the ratio between cause probability with and without conditioning on the true value of map at the i-th voxel. Dropping xv term to unclutter the equations, the numerator may be expanded as given in Equation (28).

$$p(c_k | m^i, b_{k-1}^m, xv_k) = Pr(B^{c_k}, R^{c_k} | m^i, b_{k-1}^m, xv_k) = \quad (28)$$
$$Pr(B^{c_k} | m^i, b_{k-1}^m, xv_k) Pr(R^{c_k} | B^{c_k}, m^i, b_{k-1}^m, xv_k) =$$
$$\begin{cases} \hat{m}^{c_k} \prod_{l=1}^{c_k^l-1} \left(1 - \hat{m}^{g(l,xv)}\right) & \text{if } c_k^l < i^l \\ \hat{m}^i \prod_{l=1}^{c_k^l-1} \left(1 - \hat{m}^{g(l,xv)}\right) & \text{if } c_k^l = i^l \\ \hat{m}^{c_k} \left(\prod_{l=1}^{i^l-1} \left(1 - \hat{m}^{g(l,xv)}\right)\right)(1 - m^i) \left(\prod_{l=i^l+1}^{c_k^l-1} \left(1 - \hat{m}^{g(l,xv)}\right)\right) & \text{if } c_k^l > i^l \end{cases}$$

The denominator is $$p(c_k | b_{k-1}^m, xv_k) = \hat{m}^{c_k} \prod_{l=i^l+1}^{c_k^l-1} \left(1 - \hat{m}^{g(l,xv)}\right)$$

for all $c_k \in C(xv)$. In these equations, $c_k^l = g^{-1}(c_k, xv_k)$ and $i^l = g^{-1}(i, xv_k)$ are the corresponding indices of $c_k$ and $i$ in the local frame.

According to the cause probability definitions, the ratio may be written as given in Equation (29).

$$\frac{Pr(c_k | m^i, b_{k-1}^m, xv_k)}{Pr(c_k | b_{k-1}^m, xv_k)} = \begin{cases} 1 & \text{if } c_k^l < i^l \\ \hat{m}^i (\hat{m}^i)^{-1} & \text{if } c_k^l = i^l \\ (1 - m^i)(1 - \hat{m}^i)^{-1} & \text{if } c_k^l > i^l \end{cases} \quad (29)$$

It should be noted that $\hat{m}$ may denote the mean of m.

Plugging the ratio back into Equation (27), Equation (30) may be given as follows.

$$p(m^i | z_{0:k}, xv_{0:k}) = \left[\sum_{c_k^l=1}^{i^l-1} Pr(c_k | b_{k-1}^m, z_k, xv_k) + \right. \quad (30)$$
$$m^i(\hat{m}^i)^{-1} Pr(c_k | b_{k-1}^m, z_k, xv_k) + (1 - m^i)(1 - \hat{m}^i)^{-1}$$
$$\left. \sum_{c_k^l=i^l+1}^{|C(xv)|} Pr(c_k | b_{k-1}^m, z_k, xv_k) \right] p(m^i | z_{0:k-1}, xv_{0:k-1})$$

Collecting linear and constant terms, Equation (30) may be simplified as given in Equation (31).

$$p(m^i | z_{0:k}, xv_{0:k}) = (\alpha^i m^i + \beta^i) p(m^i | z_{0:k-1}, xv_{0:k-1}) \quad (31)$$

where $$\alpha^i = \sum_{c_k^l=1}^{i^l-1} Pr(c_k | b_{k-1}^m, z_k, xv_k) + (1 - \hat{m}^i)^{-1} \sum_{c_k^l=i^l+1}^{|C(xv)|} Pr(c_k | b_{k-1}^m, z_k, xv_k) \quad (32)$$

and $$\beta^i = \qquad (33)$$
$$(\hat{m}^i)^{-1} Pr(c_k | b_{k-1}^m, z_k, xv_k) - (1 - \hat{m}^i)^{-1} \sum_{c_k^l = i^l + 1}^{|C(xv)|} Pr(c_k | b_{k-1}^m, z_k, xv_k)$$

In a more compact form, Equation (31) may be re-written as Equation (34).

$$b_{k+1}^{m^i} = \tau^i(b_k^{m^i}, z_{k+1}, xv_{k+1}) \qquad (34)$$

where $b_k^{m^i} = p(m^i | z_{0:k}, xv_{0:k})$.

Accordingly, the inverse cause model may be written in accordance with Equation (35).

$$Pr(c_k | b_{k-1}^m, z_k, xv_k) = \frac{p(z_k | c_k, xv_k) Pr(c_k | b_{k-1}^m, xv_k)}{p(z_k | b_{k-1}^m, xv_k)} \qquad (35)$$

$$= \eta' p(z_k | c_k, xv_k) Pr(c_k | b_{k-1}^m, xv_k)$$

$$= \eta' p(z_k | c_k, xv_k) \hat{m}_{k-1}^{c_k} \prod_{j=1}^{c_k^l - 1} \left(1 - \hat{m}_{k-1}^{g(j,xv)}\right),$$

$$\forall c_k \in C(xv_k)$$

In some configurations, the electronic device may plan 406 a path in accordance with the following. For example, the electronic device 102 may plan 406 a path with a confidence-aware grid or map. In particular, the following describes planning that utilizes a map with confidence values (e.g., a confidence-rich representation) as described herein.

One objective in planning is to get to the goal point, while avoiding obstacles (e.g., minimizing collision probability). To accomplish this, the planner may reason about the acquisition of future perceptual knowledge and incorporate this knowledge in planning. One benefit of the confidence-rich map is that it enables efficient prediction of the map evolution and map uncertainty.

In reasoning about future costs, it may be needed to first reason about future observations. Unknown future observations may be incorporated by treating them as random variables and computing their future PDF. One approach in belief space planning is to use the most likely future observations as the representative of the future observations to reason about the evolution of belief. The most likely observation at the n-th step may be denoted as illustrated in Equation (36).

$$z_n^{ml} = \underset{z}{\operatorname{argmax}} \, p(z | b_n^m, xv_n) \qquad (36)$$

Accordingly, most likely future map beliefs may be computed in accordance with Equation (37).

$$b_{n+1}^{m^i, ml} = \tau^i(b_n^{m^i, ml}, z_{n+1}^{ml}, xv_{n+1}), n \geq k \qquad (37)$$

where $b_{n+1}^{m^i, ml} = b_k^{m^i}$.

To assign a cost $J(x_k, b_k^m, \text{path})$ to a given path path=$(xv_k, u_k, xv_{k+1}, u_{k+1}, \ldots, xv_N)$ starting from $xv_k$, when a map looks like $b_k^m$, the map belief may be predicted along the path via Equation (37).

Assuming an additive cost, the path cost may be obtained by adding up one-step costs as illustrated in Equation (38).

$$J(x_k, b_k^m, \text{path}) = \sum_{n=k}^{N} c(b_n^{m, ml}, xv_n, u_n) \qquad (38)$$

where the cost in belief space may be induced by an underlying cost in the state space as illustrated in Equation (39).

$$c(b_n^{m, ml}, xv_n, u_n) = \int c(m_n, xv_n, u_n; b_n^{m, ml}) b_n^{m, ml}(m_n) dm_n \qquad (39)$$

The underlying one-step cost $c(m_n, xv_n, u_n; b_n^{m, ml})$ may depend on the application at hand. For safe navigation with grid maps, the following cost function illustrated in Equation (40) may be utilized in some configurations.

$$c(m, xv, u; b^m) = m^j + (m^j - \hat{m}^j)^2 \qquad (40)$$

where j is the index of the voxel (e.g., cell) where the object (e.g., electronic device 102, vehicle, robot, drone, etc.) is. In other words, $x \in m^j$.

As a result, the cost in belief space may be as illustrated in Equation (41).

$$c(b_n^m, xv_n, u_n) = \hat{m}_n^j + \sigma(m_n^j) + E[m_n^j | z_{k+1:n}, xv_{k+1:n}, b_k^m] + Var[m_n^j | z_{k+1:n}, xv_{k+1:n}, b_k^m] \qquad (41)$$

It should be noted that the above observations may be "future observation."

Path planning 406 may be performed as follows in some configurations. To generate the plan, a rapidly exploring random trees (RRT) approach may be utilized to create a set of candidate trajectories $\Pi = \{\text{path}^i\}$. For each trajectory, the cost $c(\text{path}^i)$ may be computed and the path with minimum cost may be selected as illustrated in Equation (42).

$$\text{path}^* = \underset{\Pi}{\operatorname{argmin}} J(x_k, b_k^m, \text{path}) \qquad (42)$$

As described above, some configurations of the systems and methods disclosed herein enable joint design of grid-based mapping and planning methods. The mapping algorithm may represent occupancy level as a probability distribution that enables the planning method to predict the future evolution of the map under different candidate trajectories.

Figure 5:
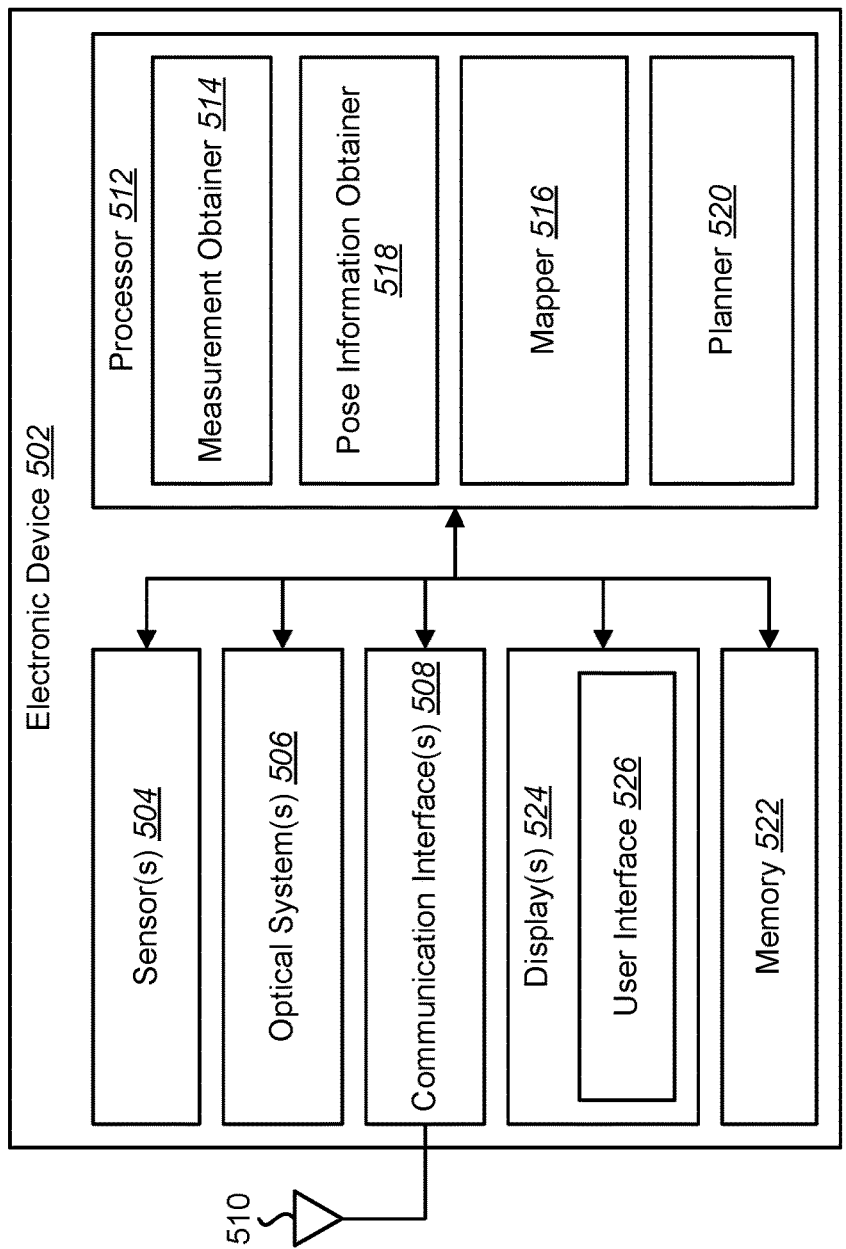
FIG. 5 is a block diagram illustrating a more specific example of an electronic device in which systems and methods for mapping an environment may be implemented.

FIG. 5 is a block diagram illustrating a more specific example of an electronic device 502 in which systems and methods for mapping an environment may be implemented. The electronic device 502 described in connection with FIG. 5 may be an example of the electronic device 102 described in connection with FIG. 1. The electronic device 502 may include one or more components or elements. One or more of the components or elements may be implemented in hardware (e.g., circuitry), a combination of hardware and firmware, and/or a combination of hardware and software (e.g., a processor with instructions).

In some configurations, the electronic device 502 may perform one or more of the functions, procedures, methods, steps, etc., described in connection with one or more of FIGS. 1-4 and 6-9. Additionally or alternatively, the electronic device 502 may include one or more of the structures described in connection with one or more of FIGS. 1-4 and 6-9.

In some configurations, the electronic device 502 may include a processor 512, a memory 522, one or more displays 524, one or more sensors 504 (e.g., one or more depth sensors, stereoscopic cameras, image sensors, light detection and ranging (LIDAR) sensors, time-of-flight (ToF)

cameras, motion sensors, position sensors, accelerometers, tilt sensors, gyroscopes, compasses, barometers, etc.), one or more optical systems 506, and/or one or more communication interfaces 508. The processor 512 may be coupled to (e.g., in electronic communication with) the memory 522, display 524, sensor(s) 504, optical system(s) 506, and/or communication interface(s) 508. It should be noted that one or more of the elements of the electronic device 502 described in connection with FIG. 5 (e.g., sensor(s) 504, optical system(s) 506, communication interface(s) 508, display(s) 524, etc.), may be optional and/or may not be included (e.g., implemented) in the electronic device 502 in some configurations.

One or more of the sensor(s) 504, optical system(s) 506, communication interface(s) 508, display(s) 524, memory 522, or processor 512 may be implemented similarly to corresponding components described in connection with FIG. 1.

The processor 512 may include and/or implement a measurement obtainer 514, a pose information obtainer 518, a mapper 516, and/or a planner 520. One or more of the measurement obtainer 514, pose information obtainer 518, and/or mapper 516 may be implemented similarly to corresponding components described in connection with FIG. 1.

The memory 522 may store instructions and/or data. Examples of instructions and/or data that may be stored by the memory 522 may include sensor data, measurement obtainer 514 instructions, pose information obtainer 518 instructions, mapper 516 instructions, planner 520 instructions, etc. In some configurations, the memory 522 may store one or more probability distributions (e.g., PDFs), one or more confidence values, one or more measurements, one or more density estimates, pose information (e.g., camera position information, sensor position information, etc.), one or more probabilities, one or more functions, one or more paths (e.g., planned paths), etc.

In some configurations, the communication interface(s) 508 may send information (e.g., map information, probability distribution (e.g., PDF) information, voxel occupancy probability distribution information, confidence information, image information, object detection information, path information, planning information, etc.) to and/or receive information (e.g., map information, probability distribution (e.g., PDF) information, voxel occupancy probability distribution information, confidence information, image information, object detection information, path information, planning information, destination information, goal information, etc.) from another device (e.g., a vehicle, a smart phone, a camera, a display, a remote server, a robot, a drone, etc.). For example, the electronic device 502 may receive sensor data (e.g., depth information and/or pose information) from a remote device. The electronic device 502 may utilize the sensor data to determine one or more voxel occupancy probability distributions, confidence values, maps, and/or planning information (e.g., one or more paths, movement control information, etc.). The electronic device 502 may send the one or more voxel occupancy probability distributions, confidence values, maps, and/or planning information to the remote device. The remote device may utilize the one or more voxel occupancy probability distributions, confidence values, maps, and/or planning information to perform an operation (e.g., plan a path, control movement, etc.).

In some configurations, the electronic device 502 may present a user interface 526 on the display 524. For example, the user interface 526 may enable a user to interact with the electronic device 502. In some configurations, the user interface 526 may enable a user to interact with the electronic device 502. For example, the user interface 526 may receive a touch, a mouse click, a gesture, a keyboard input, and/or some other indication that indicates an input. In some configurations, the user interface 526 may receive destination information based on an input from a user.

The electronic device 502 (e.g., processor 512) may optionally be coupled to, be part of (e.g., be integrated into), include and/or implement one or more kinds of devices. For example, the electronic device 502 may be implemented in a vehicle or a drone equipped with one or more sensors. In another example, the electronic device 502 (e.g., processor 512) may be implemented in an action camera. In yet other examples, the electronic device 502 may be implemented in an augmented reality headset or a virtual reality headset. In yet another example, the electronic device 502 may be implemented in a robot.

As described above in connection with FIG. 1, the measurement obtainer 514 may obtain one or more sensor measurements. The pose information obtainer 518 may obtain pose information. The mapper 516 may produce one or more voxel occupancy probability distributions. Additionally or alternatively, the mapper 516 may produce one or more confidence values, maps, density levels, etc.

In some configurations, the processor 512 may include and/or implement a planner 520. The planner 520 may plan a path based on one or more voxel occupancy probability distributions. In some configurations, the planner 520 may plan a path as described in connection with FIG. 4. For example, the planner 520 may compute one or more future probability distributions (e.g., PDFs), may compute one or more candidate trajectories (e.g., paths), may compute costs of one or more candidate trajectories (e.g., paths), and/or may select a path with a minimum cost. In some configurations, the planner 520 may control the electronic device 502 (and/or another object) to move along the selected path. For example, the electronic device 502 (e.g., processor 512) may operate (and/or may provide instructions for the operation of) one or more movement mechanisms (e.g., drive train, brakes, propellers, jets, wheels, tracks, appendages, etc.) to move the electronic device 502 and/or another object (e.g., remote device) along a path that avoids obstacles.

It should be noted that one or more of the elements or components of the electronic device 502 may be combined and/or divided. For example, the measurement obtainer 514, the pose information obtainer 518, the mapper 516, and/or the planner 520 may be combined. Additionally or alternatively, one or more of the measurement obtainer 514, the pose information obtainer 518, and/or the mapper 516 may be divided into elements or components that perform one or more subsets of the operations thereof.

Figure 6:
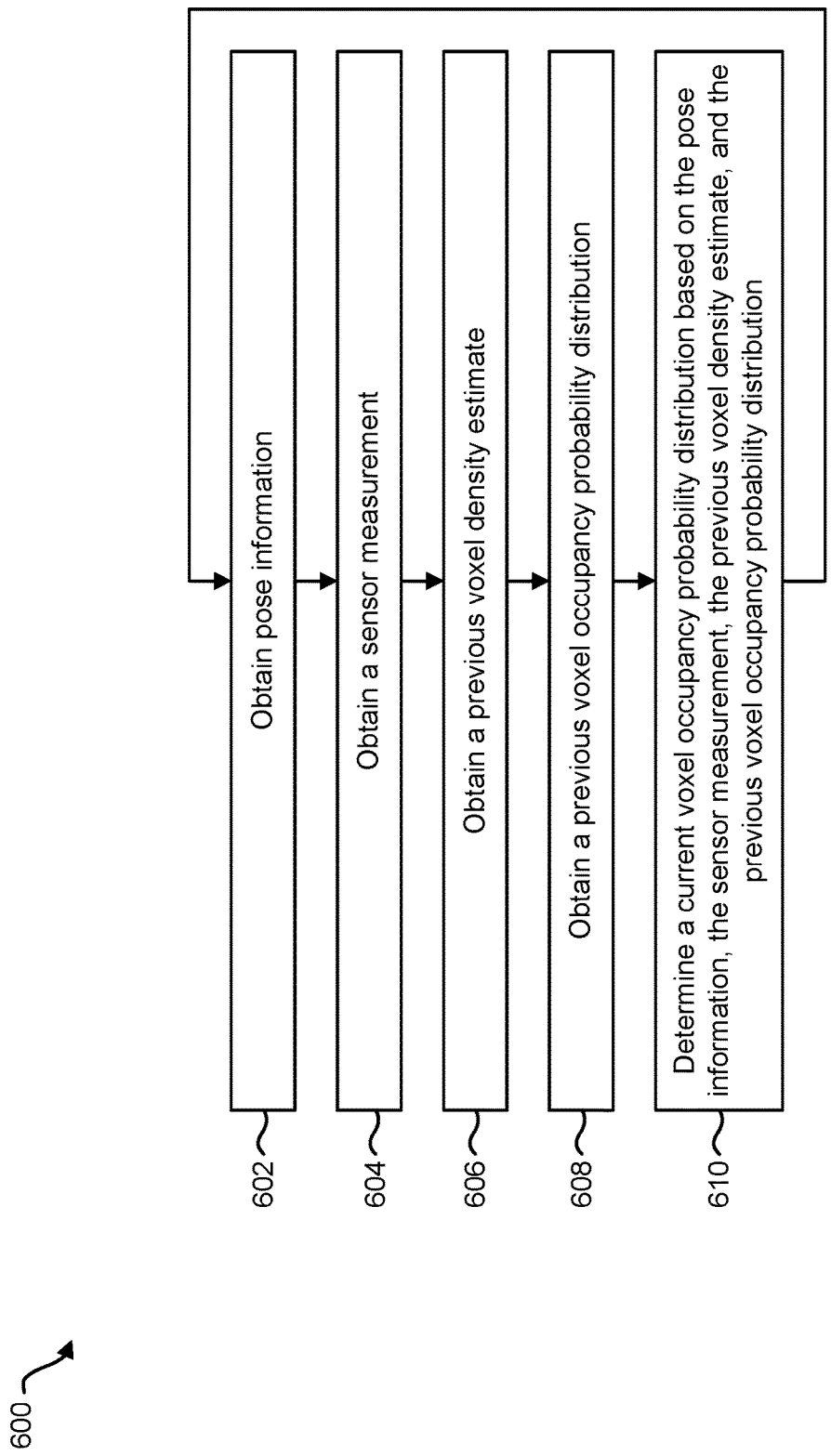
FIG. 6 is a flow diagram illustrating a more specific configuration of a method for mapping an environment.

FIG. 6 is a flow diagram illustrating a more specific configuration of a method 600 for mapping an environment. The method 600 may be performed by one or more of the electronic devices 102, 502 described herein. In some configurations, one or more steps of the 600 may be combined with one or more of the functions, procedures, and/or method steps described herein.

The electronic device 102 may obtain 602 pose information. This may be accomplished as described in connection with one or more of FIGS. 1, 3, and 5. For example, the electronic device 102 may detect, determine, request, and/or receive a camera position (e.g., $x_k$) and/or a sensor position (e.g., $v_k$). The camera position may indicate a location and/or orientation of a camera (e.g., depth sensor, image sensor, and/or optical system). The sensor position may indicate a sample (e.g., pixel) position. In some configurations, the pose information may indicate a ray (e.g., $xv_k$).

The electronic device 102 may obtain 604 a sensor measurement. This may be accomplished as described in connection with one or more of FIGS. 1-5. For example, the electronic device 102 may detect, determine, request, and/or receive a sensor measurement (e.g., $z_k$). The sensor measurement may indicate a depth measurement for a sample (e.g., pixel).

The electronic device 102 may obtain 606 a previous voxel density estimate. This may be accomplished as described in connection with FIG. 1. For example, the electronic device 102 may retrieve, request, and/or receive a previous voxel density estimate. For instance, the electronic device 102 may have previously stored a voxel density estimate for a particular voxel in memory. The electronic device 102 may retrieve the previous voxel density estimate. In some configurations, the previous voxel density estimate may be denoted by $m^i_{k-1}$.

The electronic device 102 may obtain 608 a previous voxel occupancy probability distribution. This may be accomplished as described in connection with FIG. 1. For example, the electronic device 102 may retrieve, request, and/or receive a previous voxel occupancy probability distribution. For instance, the electronic device 102 may have previously stored a voxel occupancy probability distribution for a particular voxel in memory. The electronic device 102 may retrieve the previous voxel occupancy probability distribution. In some configurations, the voxel occupancy probability distribution may be denoted by $p(\theta^i|z_{0:k-1}, xv_{0:k-1})$.

The electronic device 102 may determine 610 a current voxel occupancy probability distribution based on the pose information, the sensor measurement, the previous voxel density estimate, and the previous voxel occupancy probability distribution. This may be accomplished as described in connection with one or more of FIGS. 1-2 and 4-5. For example, the electronic device 102 may determine the current voxel occupancy probability distribution (e.g., $p(\theta^i|z_{0:k}, xv_{0:k})$) in accordance with Equations (1)-(4), (10), and/or (13). In some configurations, the electronic device 102 may perform one or more operations based on the current voxel occupancy probability distribution. It should be noted that the method 600 may be performed for multiple samples (e.g., pixels), multiple sensor measurements at different times, and/or multiple sensor measurements from different sensors (at the same or different times, for example) in some configurations.

Figure 7:
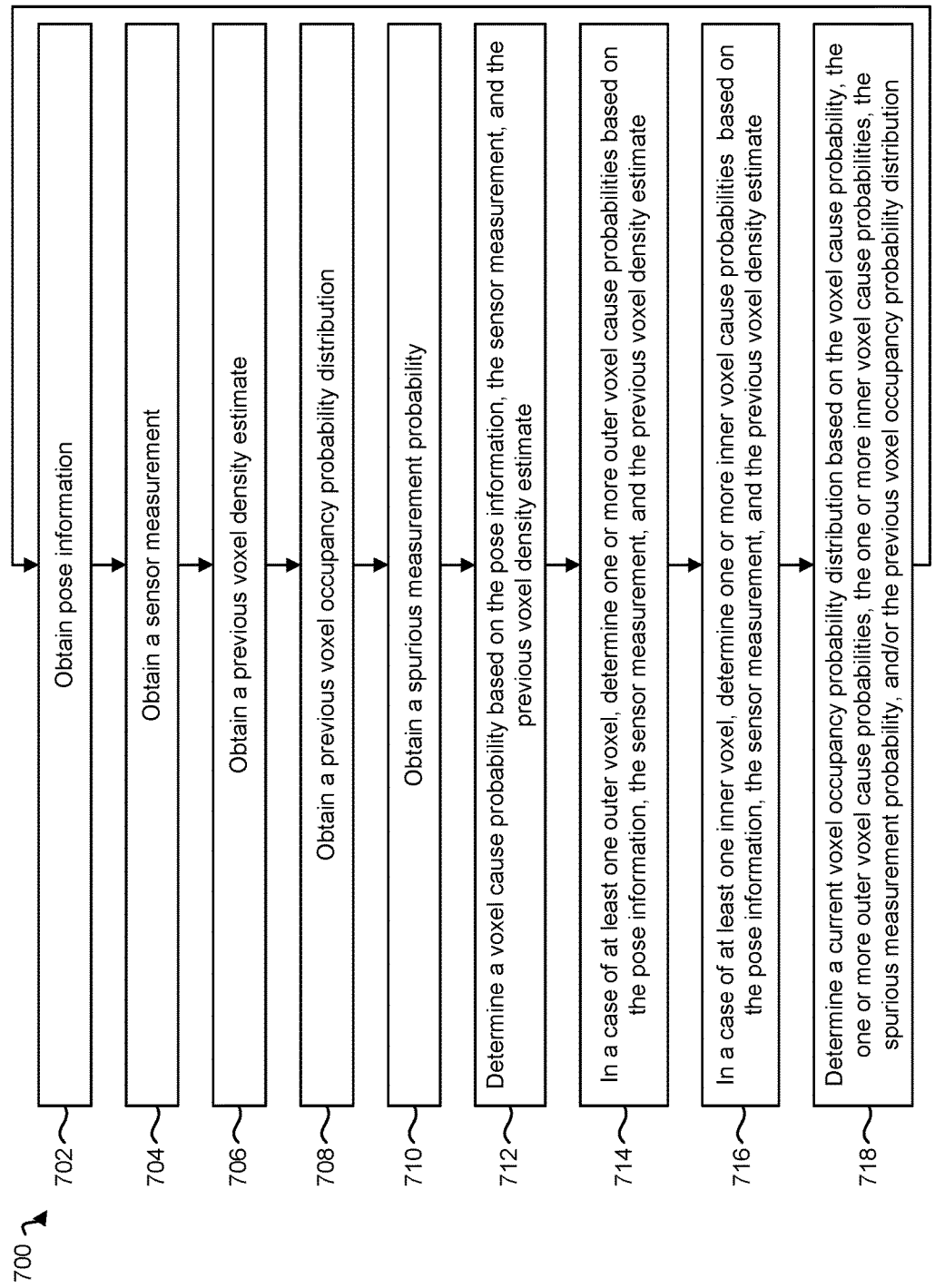
FIG. 7 is a flow diagram illustrating another more specific configuration of a method for mapping an environment.

FIG. 7 is a flow diagram illustrating another more specific configuration of a method 700 for mapping an environment. The method 700 may be performed by one or more of the electronic devices 102, 502 described herein. In some configurations, one or more steps of the 700 may be combined with one or more of the functions, procedures, and/or method steps described herein.

The electronic device 102 may obtain 702 pose information (e.g., $xv_k$). This may be accomplished as described in connection with one or more of FIGS. 1, 3, and 5-6.

The electronic device 102 may obtain 704 a sensor measurement (e.g., $z_k$). This may be accomplished as described in connection with one or more of FIGS. 1-6.

The electronic device 102 may obtain 706 a previous voxel density estimate (e.g., $m_{k-1}^i$). This may be accomplished as described in connection with one or more of FIGS. 1 and 6.

The electronic device 102 may obtain 708 a previous voxel occupancy probability distribution (e.g., $P(\theta^i|z_{0:k-1}, xv_{0:k-1})$). This may be accomplished as described in connection with one or more of FIGS. 1 and 6.

The electronic device 102 may obtain 710 a spurious measurement probability (e.g., $p_{rand}$). This may be accomplished as described in connection with FIG. 1. For example, the electronic device 102 may retrieve a spurious measurement probability stored in memory. In some configurations, the spurious measurement probability may be predetermined. Additionally or alternatively, the electronic device 102 may request and/or receive the spurious measurement probability (from another device, for example).

The electronic device 102 may determine 712 a voxel cause probability based on the pose information, the sensor measurement, and the previous voxel density estimate. This may be accomplished as described in connection with FIG. 1. For example, the electronic device 102 may determine (e.g., calculate, compute, etc.) $Pr(c_k = c^{i'}|m_{k-1}, z_k, xv_k)$.

In a case of at least one outer voxel, the electronic device 102 may determine 714 one or more outer voxel cause probabilities based on the pose information, the sensor measurement, and the previous voxel density estimate. This may be accomplished as described in connection with FIG. 1. For example, the electronic device 102 may determine (e.g., calculate, compute, etc.) $Pr(c_k = c^{r'}|m_{k-1}, z_k, xv_k)$ for one or more outer voxels (that are beyond the voxel under consideration, for instance). In a case where there are no outer voxels, the electronic device 102 may not make this determination 714 or may determine the one or more probabilities as 0 in some configurations.

In a case of at least one inner voxel, the electronic device 102 may determine 716 one or more inner voxel cause probabilities based on the pose information, the sensor measurement, and the previous voxel density estimate. This may be accomplished as described in connection with FIG. 1. For example, the electronic device 102 may determine (e.g., calculate, compute, etc.) $Pr(c_k = c^{r'}|m_{k-1}, z_k, xv_k)$ for one or more inner voxels (that are between the camera and the voxel under consideration, for instance). In a case where there are no inner voxels, the electronic device 102 may not make this determination 716 or may determine the one or more probabilities as 0 in some configurations.

The electronic device 102 may determine 718 a current voxel occupancy probability distribution based on the voxel cause probability, the one or more outer voxel cause probabilities, the one or more inner voxel cause probabilities, the spurious measurement probability, and/or the previous voxel occupancy probability distribution. This may be accomplished as described in connection with one or more of FIGS. 1-2 and 4-6. For example, the electronic device 102 may determine the current voxel occupancy probability distribution (e.g., $p(\theta^i|z_{0:k}, xv_{0:k})$) in accordance with Equations (1)-(4), (10), and/or (13). In some configurations, the electronic device 102 may perform one or more operations based on the current voxel occupancy probability distribution. It should be noted that the method 700 may be performed for multiple samples (e.g., pixels), multiple sensor measurements at different times, and/or multiple sensor measurements from different sensors (at the same or different times, for example) in some configurations.

Figure 8:
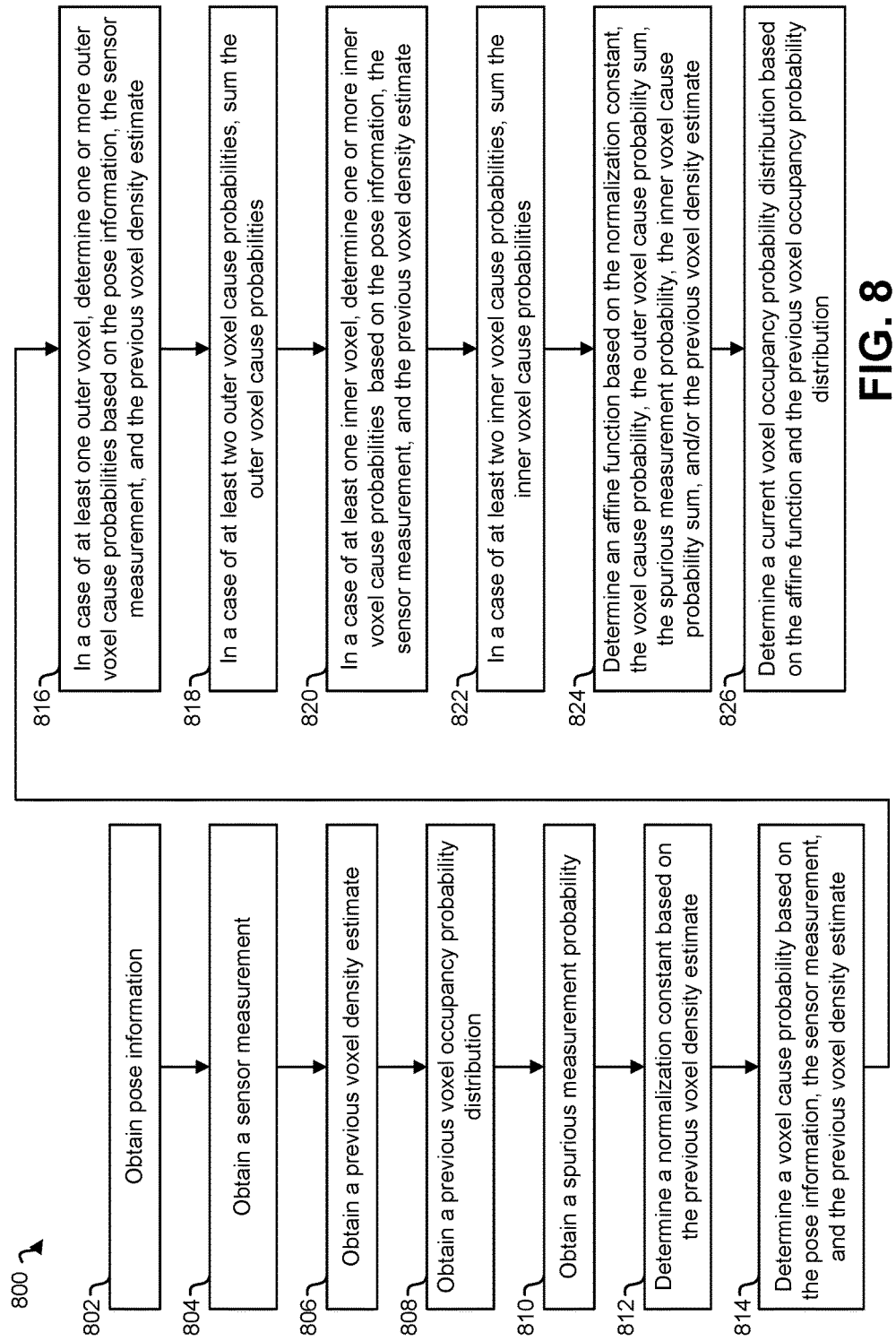
FIG. 8 is a flow diagram illustrating yet another more specific configuration of a method for mapping an environment.

FIG. 8 is a flow diagram illustrating yet another more specific configuration of a method 800 for mapping an environment. The method 800 may be performed by one or more of the electronic devices 102, 502 described herein. In some configurations, one or more steps of the 800 may be combined with one or more of the functions, procedures, and/or method steps described herein.

The electronic device 102 may obtain 802 pose information (e.g., $xv_k$). This may be accomplished as described in connection with one or more of FIGS. 1, 3, and 5-7.

The electronic device 102 may obtain 804 a sensor measurement (e.g., $z_k$). This may be accomplished as described in connection with one or more of FIGS. 1-7.

The electronic device 102 may obtain 806 a previous voxel density estimate (e.g., $m_{k-1}^i$). This may be accomplished as described in connection with one or more of FIGS. 1 and 6-7.

The electronic device 102 may obtain 808 a previous voxel occupancy probability distribution (e.g., $p(\theta^i|z_{0:k-1}, xv_{0:k-1}))$. This may be accomplished as described in connection with one or more of FIGS. 1 and 6-7.

The electronic device 102 may obtain 810 a spurious measurement probability (e.g., $p_{rand}$). This may be accomplished as described in connection with one or more of FIGS. 1 and 7.

The electronic device 102 may determine 812 a normalization constant based on the previous voxel density estimate. This may be accomplished as described in connection with FIG. 1. For example, the electronic device 102 may determine (e.g., calculate, compute, etc.)

$$\eta = \frac{1}{m_{k-1}^i(1 - m_{k-1}^i)}.$$

The electronic device 102 may determine 814 a voxel cause probability based on the pose information, the sensor measurement, and the previous voxel density estimate. This may be accomplished as described in connection with one or more of FIGS. 1 and 7. For example, the electronic device 102 may determine (e.g., calculate, compute, etc.) $Pr(c_k=c^{i^j}|m_{k-1}, z_k, xv_k)$. In some approaches, one or more Monte-Carlo methods may be utilized to compute $Pr(c_k=c^{i^j}|m_{k-1}, z_k, xv_k)$.

In a case of at least one outer voxel, the electronic device 102 may determine 816 one or more outer voxel cause probabilities based on the pose information, the sensor measurement, and the previous voxel density estimate. This may be accomplished as described in connection with one or more of FIGS. 1 and 7. For example, the electronic device 102 may determine (e.g., calculate, compute, etc.) $Pr(c_k=c^r|m_{k-1}, z_k, xv_k)$ for one or more outer voxels. In some approaches, one or more Monte-Carlo methods may be utilized to compute $Pr(c_k=c^r|m_{k-1}, z_k, xv_k)$. In a case where there are no outer voxels, the electronic device 102 may not make this determination 814 or may determine the one or more probabilities as 0 in some configurations.

In a case of at least two outer voxel cause probabilities, the electronic device 102 may sum 818 the outer voxel cause probabilities. This may be accomplished as described in connection with FIG. 1. For example, the electronic device 102 may determine (e.g., calculate, compute, etc.)

$$\sum_{r=0, i^l+1:Y} Pr(c_k = c^r | m_{k-1}, z_k, xv_k).$$

In a case of just one outer voxel cause probability, the one outer voxel cause probability may be used instead of the sum.

In a case of at least one inner voxel, the electronic device 102 may determine 820 one or more inner voxel cause probabilities based on the pose information, the sensor measurement, and the previous voxel density estimate. This may be accomplished as described in connection with one or more of FIGS. 1 and 7. For example, the electronic device 102 may determine (e.g., calculate, compute, etc.) $Pr(c_k=c^r|m_{k-1}, z_k, xv_k)$ for one or more inner voxels (that are between the camera and the voxel under consideration, for instance). In a case where there are no inner voxels, the electronic device 102 may not make this determination 820 or may determine the one or more probabilities as 0 in some configurations.

In a case of at least two inner voxel cause probabilities, the electronic device 102 may sum 822 the outer voxel cause probabilities. This may be accomplished as described in connection with FIG. 1. For example, the electronic device 102 may determine (e.g., calculate, compute, etc.)

$$\sum_{r=1:i^l-1} Pr(c_k = c^r | m_{k-1}, z_k, xv_k).$$

In a case of just one inner voxel cause probability, the one inner voxel cause probability may be used instead of the sum.

The electronic device 102 may determine 824 an affine function based on the normalization constant, the voxel cause probability, the outer voxel cause probability sum, the spurious measurement probability, the inner voxel cause probability sum, and/or the previous voxel density estimate. This may be accomplished as described in connection with FIG. 1. For example, the electronic device 102 may determine (e.g., calculate, compute, etc.) $\eta(a\theta^i+b)$.

The electronic device 102 may determine 826 a current voxel occupancy probability distribution based on the affine function and the previous voxel occupancy probability distribution. This may be accomplished as described in connection with one or more of FIGS. 1-2 and 4-7. For example, the electronic device 102 may determine (e.g., calculate, compute, etc.) $p(\theta^i|z_{0:k}, xv_{0:k})=\eta(a\theta^i+b)p(\theta^i|z_{0:k-1}, xv_{0:k-1})$. In some configurations, the electronic device 102 may perform one or more operations based on the current voxel occupancy probability distribution. It should be noted that the method 800 may be performed for multiple samples (e.g., pixels), multiple sensor measurements at different times, and/or multiple sensor measurements from different sensors (at the same or different times, for example) in some configurations.

Figure 9:
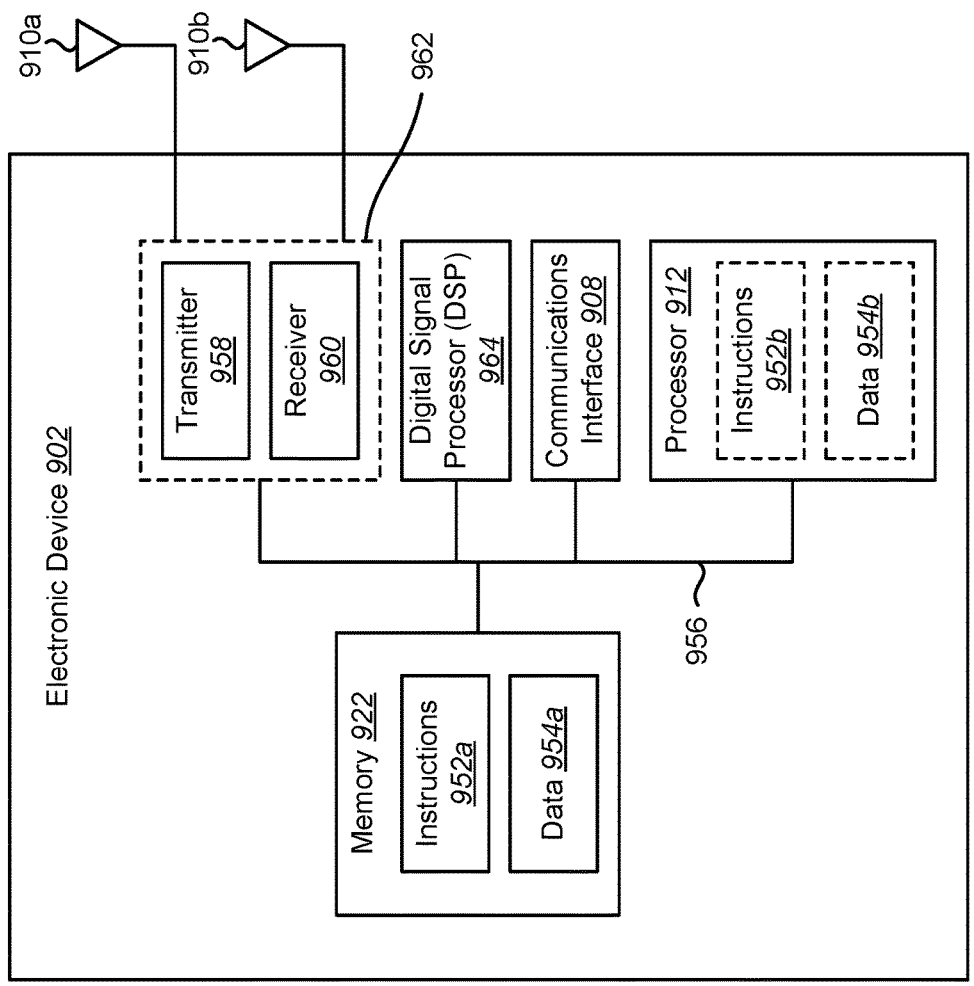
FIG. 9 illustrates certain components that may be included within an electronic device configured to implement various configurations of the systems and methods disclosed herein.

FIG. 9 illustrates certain components that may be included within an electronic device 902 configured to implement various configurations of the systems and methods disclosed herein. The electronic device 902 may be and/or may be included within a computer, a robot, a vehicle, a drone, an access terminal, an aircraft, a mobile station, a user equipment (UE), a smartphone, a digital camera, a video camera, a tablet device, a laptop computer, a desktop computer, a server, etc. The electronic device 902 may be implemented in accordance with the electronic device 102 described herein. The electronic device 902 includes a processor 912. The processor 912 may be a general purpose single- or multi-chip microprocessor (e.g., an ARM), a special purpose microprocessor (e.g., a digital signal processor (DSP)), a microcontroller, a programmable gate array, etc. The processor 912 may be referred to as a central processing unit (CPU). Although just a single processor 912 is shown in the electronic device 902, in an alternative configuration, a combination of processors (e.g., an ARM and DSP) could be implemented.

The electronic device 902 also includes memory 922. The memory 922 may be any electronic component capable of storing electronic information. The memory 922 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 954*a* and instructions 952*a* may be stored in the memory 922. The instructions 952*a* may be executable by the processor 912 to implement one or more of the methods 200, 400, 600, 700, 800 described herein. Executing the instructions 952*a* may involve the use of the data 954*a* that is stored in the memory 922. When the processor 912 executes the instructions 952, various portions of the instructions 952*b* may be loaded onto the processor 912 and/or various pieces of data 954*b* may be loaded onto the processor 912.

The electronic device 902 may also include a transmitter 958 and a receiver 960 to allow transmission and reception of signals to and from the electronic device 902. The transmitter 958 and receiver 960 may be collectively referred to as a transceiver 962. One or more antennas 910*a*-*b* may be electrically coupled to the transceiver 962. The electronic device 902 may also include (not shown) multiple transmitters, multiple receivers, multiple transceivers and/or additional antennas.

The electronic device 902 may include a digital signal processor (DSP) 964. The electronic device 902 may also include a communications interface 908. The communications interface 908 may allow and/or enable one or more kinds of input and/or output. For example, the communications interface 908 may include one or more ports and/or communication devices for linking other devices to the electronic device 902. In some configurations, the communications interface 908 may include the transmitter 958, the receiver 960, or both (e.g., the transceiver 962). Additionally or alternatively, the communications interface 908 may include one or more other interfaces (e.g., touchscreen, keypad, keyboard, microphone, camera, etc.). For example, the communication interface 908 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 956.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for mapping an environment by an electronic device, the method comprising:
   obtaining a set of sensor measurements comprising at least one of depth measurements or image data;
   determining a set of voxel occupancy probability distributions respectively corresponding to a set of voxels based on the set of sensor measurements, wherein each of the voxel occupancy probability distributions represents a probability of occupancy of a voxel over a range of occupation densities, wherein the range comprises partial occupation densities; and
   updating the set of voxel occupancy probability distributions based on an affine function.

2. The method of claim 1, further comprising, determining a set of confidence values respectively corresponding to the set of voxels.

3. The method of claim 2, wherein each of the set of confidence values is a variance respectively based on each of the set of voxel occupancy probability distributions.

4. The method of claim 1, wherein determining and updating each of the set of voxel occupancy probability distributions is based on an inverse cause model.

5. The method of claim 1, wherein determining and updating each of the set of voxel occupancy probability distributions is based on Bayes' rule.

6. The method of claim 1, wherein determining and updating each of the set of voxel occupancy probability distributions is based on a fusion of measurements from different times.

7. The method of claim 1, wherein determining and updating each of the set of voxel occupancy probability distributions is based on a fusion of measurements from different sensors.

8. The method of claim 1, wherein updating each of the set of voxel occupancy probability distributions comprises multiplying a previous probability distribution with the affine function.

9. The method of claim 1, wherein determining the set of voxel occupancy probability distributions is based on an inverse cause model, wherein the inverse cause model models a probability that a voxel is a cause of one or more of the set of sensor measurements.

10. The method of claim 1, wherein the range of occupation densities is a continuous range between completely empty and completely occupied.

11. An electronic device for mapping an environment, comprising:
   a processor configured to:
      obtain a set of sensor measurements comprising at least one of depth measurements or image data;
      determine a set of voxel occupancy probability distributions respectively corresponding to a set of voxels based on the set of sensor measurements, wherein each of the voxel occupancy probability distributions represents a probability of occupancy of a voxel over a range of occupation densities, wherein the range comprises partial occupation densities; and
      update the set of voxel occupancy probability distributions based on an affine function.

12. The electronic device of claim 11, wherein the processor is configured to determine a set of confidence values respectively corresponding to the set of voxels.

13. The electronic device of claim 12, wherein each of the set of confidence values is a variance respectively based on each of the set of voxel occupancy probability distributions.

14. The electronic device of claim 11, wherein the processor is configured to determine and update each of the set of voxel occupancy probability distributions based on an inverse cause model.

15. The electronic device of claim 11, wherein the processor is configured to determine and update each of the set of voxel occupancy probability distributions based on Bayes' rule.

16. The electronic device of claim 11, wherein the processor is configured to determine and update each of the set of voxel occupancy probability distributions based on a fusion of measurements from different times.

17. The electronic device of claim 11, wherein the processor is configured to determine and update each of the set of voxel occupancy probability distributions based on a fusion of measurements from different sensors.

18. The electronic device of claim 11, wherein the processor is configured to update each of the set of voxel occupancy probability distributions by multiplying a previous probability distribution with the affine function.

19. The electronic device of claim 11, wherein the processor is configured to determine the set of voxel occupancy probability distributions based on an inverse cause model, wherein the inverse cause model models a probability that a voxel is a cause of one or more of the set of sensor measurements.

20. The electronic device of claim 11, wherein the range of occupation densities is a continuous range between completely empty and completely occupied.

21. A computer-program product for mapping an environment, comprising a non-transitory tangible computer-readable medium having instructions thereon, the instructions comprising:
   code for causing an electronic device to obtain a set of sensor measurements comprising at least one of depth measurements or image data;
   code for causing the electronic device to determine a set of voxel occupancy probability distributions respectively corresponding to a set of voxels based on the set of sensor measurements, wherein each of the voxel occupancy probability distributions represents a probability of occupancy of a voxel over a range of occupation densities, wherein the range comprises partial occupation densities; and
   code for causing the electronic device to update the set of voxel occupancy probability distributions based on an affine function.

22. The computer-program product of claim 21, further comprising code for causing the electronic device to determine a set of confidence values respectively corresponding to the set of voxels.

23. The computer-program product of claim 21, wherein the code for causing the electronic device to determine the set of voxel occupancy probability distributions is based on an inverse cause model, wherein the inverse cause model models a probability that a voxel is a cause of one or more of the set of sensor measurements.

24. An apparatus for mapping an environment, comprising:
   means for obtaining a set of sensor measurements comprising at least one of depth measurements or image data;
   means for determining a set of voxel occupancy probability distributions respectively corresponding to a set of voxels based on the set of sensor measurements, wherein each of the voxel occupancy probability distributions represents a probability of occupancy of a voxel over a range of occupation densities, wherein the range comprises partial occupation densities; and
   means for updating the set of voxel occupancy probability distributions based on an affine function.

25. The apparatus of claim 24, further comprising means for determining a set of confidence values respectively corresponding to the set of voxels.

26. The apparatus of claim 24, wherein the means for determining the set of voxel occupancy probability distributions is based on an inverse cause model, wherein the inverse cause model models a probability that a voxel is a cause of one or more of the set of sensor measurements.

* * * * *